United States Patent
Norby et al.

(10) Patent No.: US 6,557,651 B1
(45) Date of Patent: May 6, 2003

(54) AUTOMATED LUBRICANT DISPENSING SYSTEM AND METHOD FOR A HORIZONTAL DIRECTIONAL DRILLING MACHINE

(75) Inventors: Duane E. Norby, Otley, IA (US); Brian J. Bischel, Pella, IA (US); Steven Erickson, Pella, IA (US); Gregg A. Austin, Pella, IA (US); Scott A. Rempe, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 09/637,410

(22) Filed: Aug. 11, 2000

Related U.S. Application Data

(60) Provisional application No. 60/148,369, filed on Aug. 11, 1999.

(51) Int. Cl.[7] ............................................... E21D 17/00
(52) U.S. Cl. ..................... 175/52; 184/7.9; 184/15.3; 184/6; 222/249
(58) Field of Search ............................... 184/7.9, 15.3, 184/6, 35.1; 222/249, 250; 175/52, 85; 166/84.1

(56) References Cited

U.S. PATENT DOCUMENTS

| | | |
|---|---|---|
| 2,246,874 A | 6/1941 | Burge et al. |
| 2,642,034 A | 6/1953 | Griffin et al. |
| 2,760,585 A | 8/1956 | Bergeron |
| 2,810,145 A | 10/1957 | Forrow |
| 4,199,858 A | 4/1980 | Meijs |
| 5,518,076 A | 5/1996 | Holz et al. |
| 5,586,618 A | 12/1996 | Francis |
| 6,286,627 B1 * | 9/2001 | Grach et al. ................... 184/6 |

FOREIGN PATENT DOCUMENTS

| | | | |
|---|---|---|---|
| DE | 35 37 633 | | 4/1987 |
| EP | 0 984 132 | | 8/2000 |
| WO | WO 95/25216 | | 9/1995 |
| WO | 01/11181 | * | 2/2001 |

* cited by examiner

*Primary Examiner*—William Neuder
(74) *Attorney, Agent, or Firm*—Crawford Maunu PLLC

(57) ABSTRACT

A lubrication system and method for dispensing a lubricant to threads of a drill rod and/or a spindle of a horizontal directional drilling (HDD) machine during a rod loading or unloading operation employs a pumping system having a lubricant reservoir, a pump, an applicator, and a lubricant supply conduit coupled between the pump and applicator. A heating unit is coupled to the pumping station and heats lubricant contained within the pumping system. A control unit coupled to the pumping system activates the pumping system to dispense a volume of lubricant from the applicator to the threads of the drill rod and/or spindle in response to an operator signal or an HDD machine control signal. A lubricant may be sprayed onto the spindle/drill rod threads. Alternatively, the lubricant may be communicated through a passageway defined within the spindle to one or more apertures defined within the threads of the spindle and/or the drill rod. The rate of lubrication application is preferably proportional to a rate of spindle rotation.

57 Claims, 20 Drawing Sheets

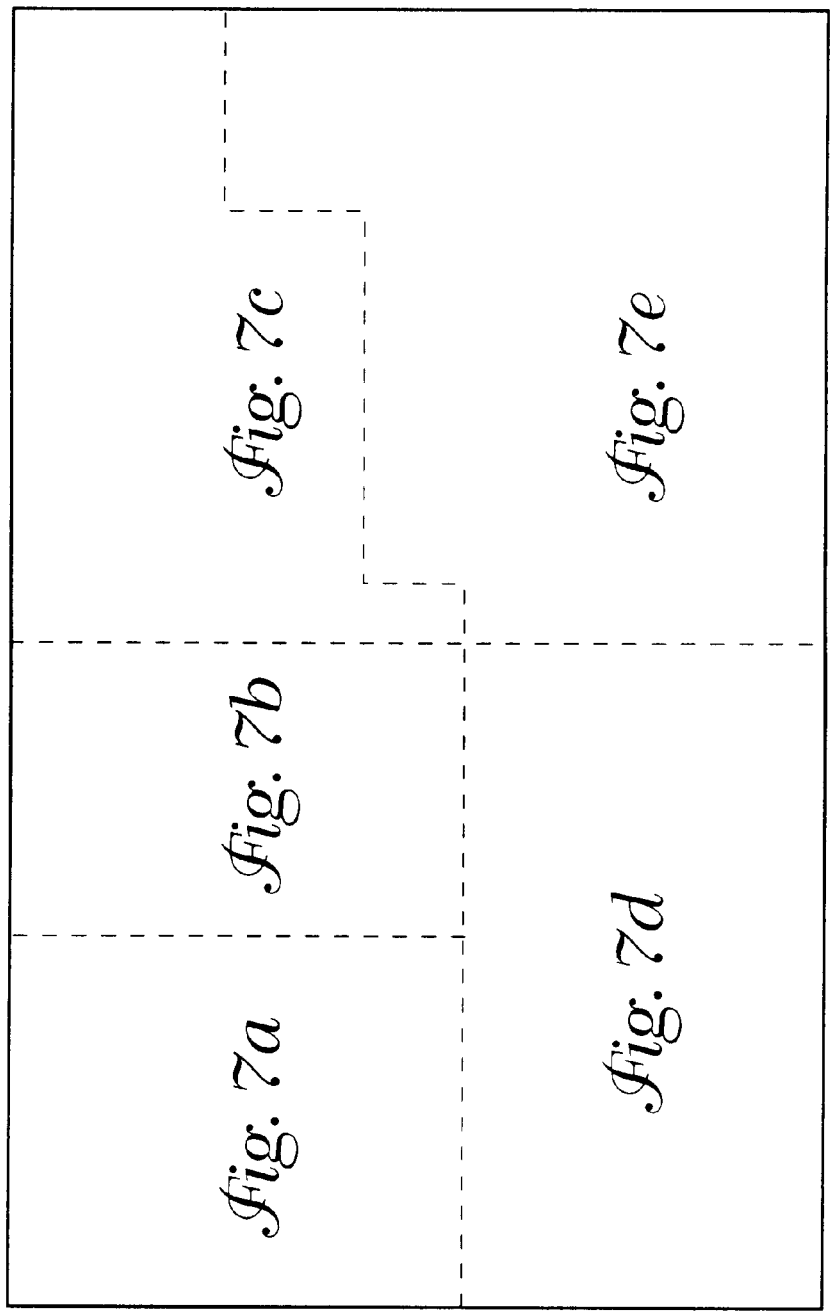

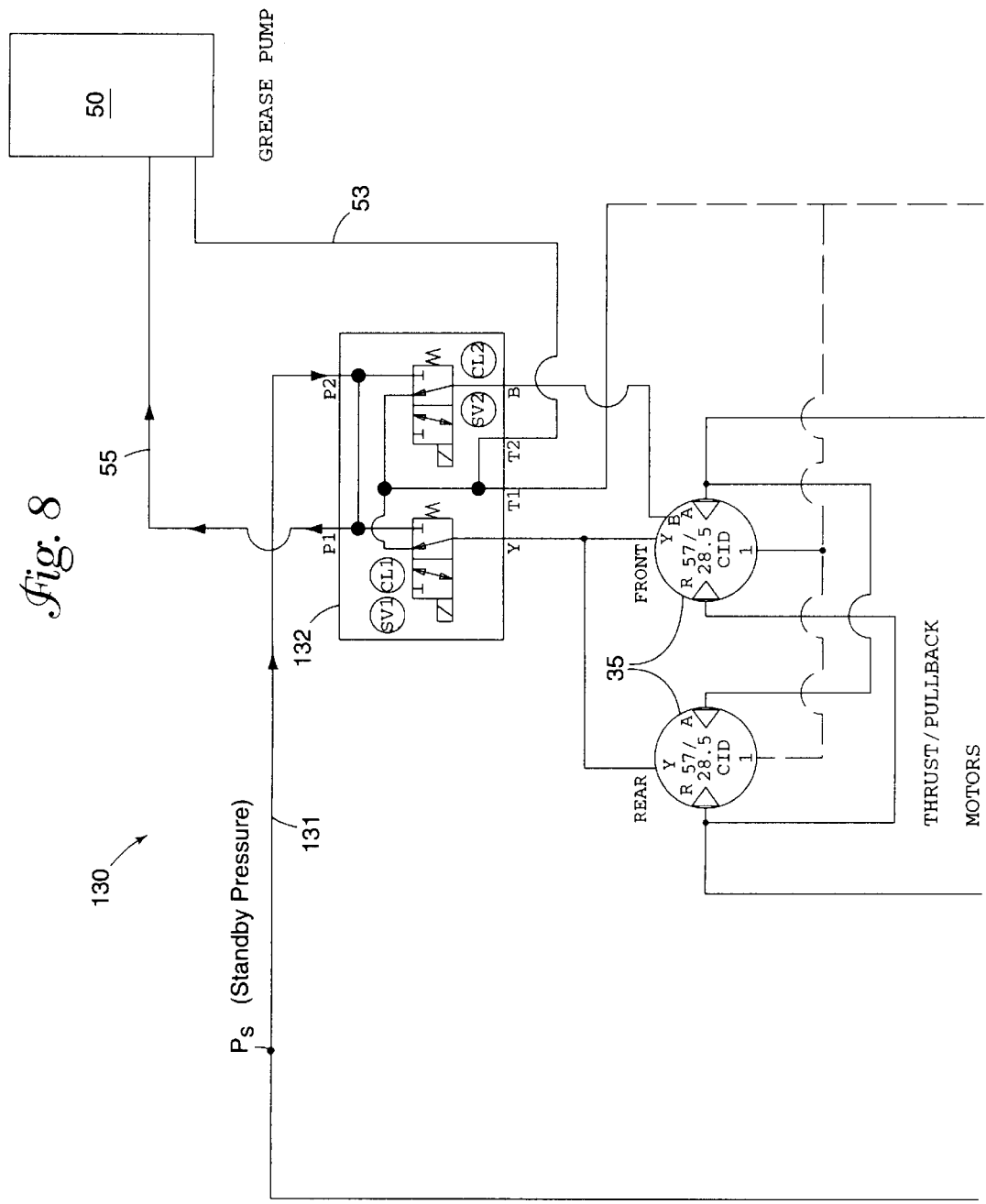

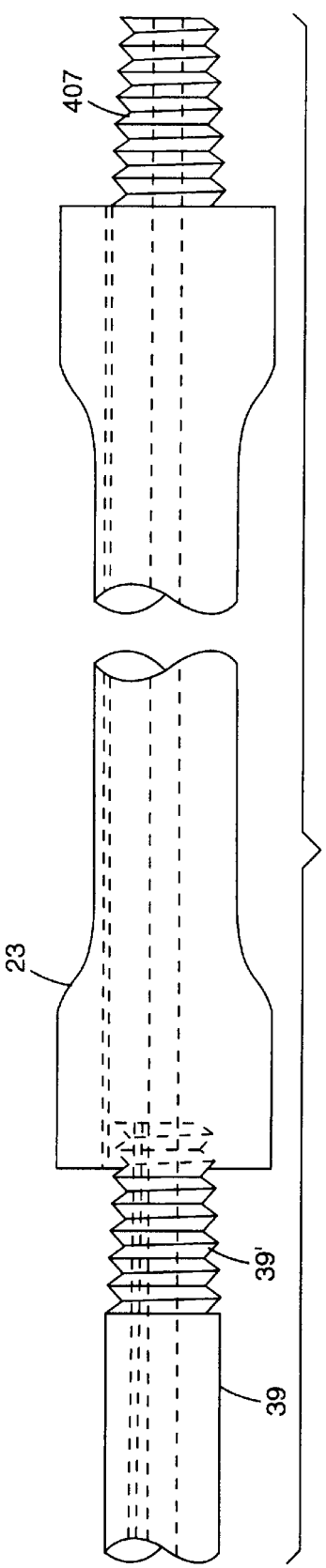
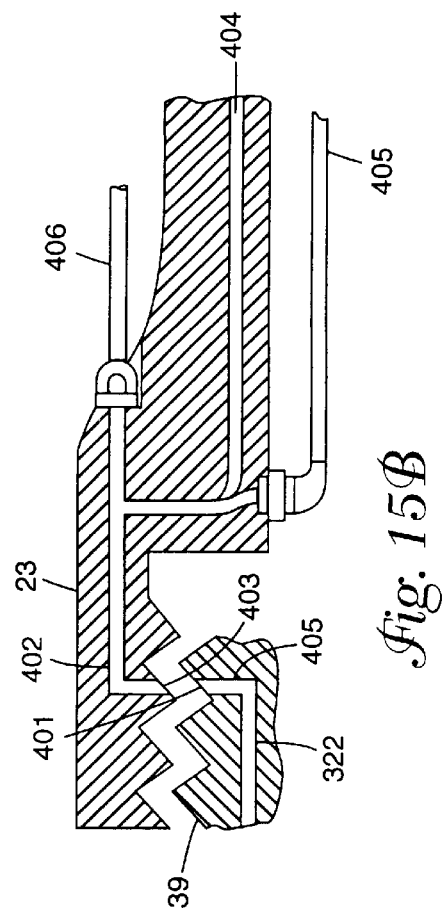
Fig. 15A
Fig. 15B

AUTOMATED LUBRICANT DISPENSING SYSTEM AND METHOD FOR A HORIZONTAL DIRECTIONAL DRILLING MACHINE

This application claims the benefit of Provisional Application No. 60/148,369, filed Aug. 11, 1999.

BACKGROUND OF THE INVENTION

The present invention relates generally to the field of underground boring and, more particularly, to a system and method of dispensing a lubricant to threaded joints between a drive spindle of a drilling machine and a drill rod being threaded or unthreaded with respect to the drive spindle.

In accordance with a general horizontal boring technique, also known as microtunnelling, horizontal directional drilling (HDD) or trenchless underground boring, a boring system is situated on the ground surface and drills a hole into the ground at an oblique angle with respect to the ground surface. A drilling fluid is typically flowed through the drill string, over the boring tool, and back up the borehole in order to remove cuttings and dirt. After the boring tool reaches a desired depth, the tool is then directed along a substantially horizontal path to create a horizontal borehole. After the desired length of borehole has been obtained, the tool is then directed upwards to break through to the earth's surface. A reamer is then attached to the drill string which is pulled back through the borehole, thus reaming out the borehole to a larger diameter. It is common to attach a utility line or other conduit to the reaming tool so that it is dragged through the borehole along with the reamer.

In order to increase the length of the drill string during a boring operation, drill rods are situated in a carriage of the HDD machine and individually threaded onto to the drill string using a spindle or drive chuck powered by a rotation motor of the HDD machine. In order to decrease the drill string length, such as during a backreaming operation, individual drill rods are unthreaded from the drill string and removed from the carriage.

It can be appreciated that the above-described threading and unthreading operations introduce stress and heat into the threaded joint interface between the spindle and drill rod. If sufficient lubricity is not present a3t the threaded joint interface, several undesirable results may occur. For example, excessive heat and friction generated at the threaded joint interface may cause premature wear on the spindle/drive chuck/drill stem. Threads of the spindle and those of a drill rod may bind together due to excessive heat, pressure, and torque. Such binding at the threaded joint interface may create a weld characteristic, thereby limiting the ability to disjoint the rod. The inability to disjoint a rod can ultimately cause failure of the boring operation.

Conventional manual approaches to applying a lubricant, such as grease, to the threaded joint interface are time consuming, labor intensive, cumbersome, and typically unpleasant. Although some degree of automation has recently been proposed, such proposed approaches are fairly crude and fail to take into account operational factors such as ambient and drilling machine temperatures, rate of spindle rotation during threading and unthreading operations, and control of lubricant application rates and volumes.

There exists a need in the excavation industry for an apparatus and methodology for automating the delivery of a lubricant to a threaded joint interface between a spindle and drill rod when making or breaking a threaded joint. There exists a further need for such an apparatus and methodology which optimizes the automatic application of a lubricant to a threaded joint interface. The present invention fulfills these and other needs.

SUMMARY OF THE INVENTION

The present invention is directed to a lubrication system for dispensing a lubricant to threads of a drill rod and/or a spindle of a horizontal directional drilling (HDD) machine during a rod loading or unloading operation. A lubrication system of the present invention includes a pumping system having a lubricant reservoir, a pump, an applicator, and a lubricant supply conduit coupled between the pump and applicator. A control unit is coupled to the pumping system. The control unit, in response to an operator signal or an HDD machine control signal, activates the pumping system to dispense a volume of lubricant from the applicator to the threads of the drill rod and/or spindle. The control unit may control the pumping system to dispense the lubricant substantially over a circumferential surface of the threads of the spindle and/or drill rod.

A heating unit may be coupled to the pumping station and heats lubricant contained within the pumping system. A heating unit may, in addition or in the alternative, be coupled to the applicator, in which case the heating unit heats lubricant within the applicator.

The heating unit includes an inlet port and an outlet port. The heating unit receives a thermal transfer fluid from the HDD machine via the inlet port and returns the thermal transfer fluid to the HDD machine via the outlet port. In one embodiment, the heating unit is coupled to a gearbox of the HDD machine. The heating unit receives a thermal transfer fluid from the gearbox via the inlet port and returns the thermal transfer fluid to the gearbox via the outlet port. The heating unit may be controlled by the control unit to vary a viscosity of the lubricant.

In accordance with another embodiment, the heating unit is coupled to an engine coolant system of the HDD machine. The heating unit receives a thermal transfer fluid from the engine coolant system via the inlet port and returns the thermal transfer fluid to the engine coolant system via the outlet port. According to a further embodiment, the heating unit is coupled to a source of electrical power provided on or external to the HDD machine. The heating unit generates heat to heat lubricant within the pumping system in response to a current received from the electrical power source.

The heating unit may further include a first heat transfer unit coupled to the pumping system to heat lubricant within the pumping system and a second heat transfer unit coupled to the applicator to heat lubricant at the applicator. In another embodiment, the heating unit includes a first heat transfer unit coupled to the pumping system to heat lubricant within the pumping system and a third heat transfer unit coupled to the lubricant supply line to heat lubricant within the lubricant supply line.

The pumping system is provided with power supplied by the HDD machine or power source external to the HDD machine. The pumping system may be provided with hydraulic or pneumatic power supplied by the HDD machine. The pumping system may alternatively be provided with electric or mechanical power from the HDD machine. In one embodiment, the pumping system is provided with hydraulic power supplied by one or both of a rotation pump or a displacement pump of the HDD machine.

The pumping system dispenses a fixed volume of lubricant through the applicator according to an embodiment of the invention. The control unit may produce a control signal to vary a rotation rate of the rod and/or spindle, and the pumping system may dispense a fixed volume of lubricant through the applicator at a variable dispensing rate during a time in which the rotation rate of the rod and/or spindle is varied.

In one embodiment, the control unit, in response to a rotation rate of the rod and/or spindle, adjusts one or more characteristics of the pumping system to dispense a desired volume of lubricant to all or selected portions of a thread of the rod and/or spindle. In another embodiment, the control unit controls a duration of dispensing produced by the pumping system during a time in which the spindle and rod are threaded together, such that the dispensing time is proportional to a rotation rate of the spindle and/or rod.

The applicator, according to one embodiment, includes a nozzle. The nozzle may include an orifice that varies in one or both of size or shape. The nozzle has an associated adjustable spray pattern. The control unit may adjust one or both of a cross-sectional width of the spray pattern or a length of the spray pattern. The pumping system may be an airless pumping system.

A cleaning apparatus may further be provided that cleans the threads of the spindle and/or rod. The control unit may disable the pumping system from dispensing lubricant until the cleaning apparatus completes cleaning of the threads of the spindle and/or rod.

The system may further include an indicator, such as a visual, auditory, or tactile indicator, that indicates the state of lubrication system readiness. The control unit activates the indicator to indicate readiness of the lubrication system when the system is enabled for activation.

In accordance with another embodiment of the present invention, a lubrication system includes a pumping system having a lubricant reservoir, a pump, a lubricant transfer collar, a spindle passageway and a lubricant transfer conduit coupled between the pump and collar. The spindle passageway is defined within a portion of the spindle and has an inlet port defined on a surface of the spindle. The pumping system is activated by the rotation of the spindle or another consistently powered machine element such that it is capable of generating a nearly constant pressure in the lubricant transfer conduit. The grease is then pumped at the appropriate time due to the fact that the aperture is blocked when the spindle is threaded to a drill rod, and opens as soon as the threaded joint begins to separate. The lubrication of the joint occurs during the unthreading action in which the aperture in the spindle is rotating relative to the drill rod.

In accordance with another embodiment, a control unit is coupled to the pumping system. The control unit, in response to an operator signal or an HDD machine control signal, activates the pumping system to dispense a volume of lubricant from the aperture to the threads of the spindle and/or drill rod.

The inlet port of the spindle passageway is preferably defined on a surface of the spindle free of threads. The lubricant reservoir and pump are preferably movably or hingedly supported on the HDD machine. The pump includes an outlet that engages the inlet port of the lubricant supply conduit.

The lubricant transfer collar may include a pump collar having an annular sealed channel that encompasses the inlet port of the spindle passageway. The pump includes an outlet that engages the pump collar.

In one embodiment, the pump constitutes a mechanical pump. The pump may include a gearbox that engages the spindle. The pump preferably dispenses lubricant at a rate proportional to a rate of rotation of the spindle when there is no outlet restriction, and subsequently maintains a constant maximum pressure. The pumping system preferably dispenses a fixed volume of lubricant through the aperture, but may alternatively dispense a varying volume of lubricant through the aperture.

The control unit may produce a control signal to vary a rotation rate of the rod and/or spindle. The pumping system may dispense a fixed volume of lubricant through the aperture at a variable dispensing rate during a time in which the rotation rate of the rod and/or spindle is varied or held constant. The control unit may also control a duration of lubricant dispensing by the pumping system during a dispensing time in which the spindle and rod are being threaded together or unthreaded, the dispensing time being proportional to a rotation rate of the spindle and/or rod.

The pumping system may further include an indicator to indicate readiness of the lubrication system. A heating unit may also be coupled to the pumping system.

Another embodiment of the present invention is directed to a method of dispensing a lubricant to threads of a drill rod and/or a spindle of a horizontal directional drilling (HDD) machine during a rod loading or unloading operation. A lubricant dispensing methodology, according to this embodiment, involves rotating the spindle and/or drill rod, and dispensing the lubricant to the threads of the spindle and/or drill rod. The method further involves controlling one of a lubricant dispensing rate or a spindle rotation rate to dispense the lubricant substantially over a circumferential threaded surface of the spindle and/or drill rod.

Dispensing the lubricant may involve dispensing a fixed or varying volume of the lubricant. The lubricant dispensing rate may be controlled as a function of spindle rotation rate. In one embodiment, the rate at which a fixed volume of the lubricant is dispensed is controlled as a function of spindle rotation rate. In another embodiment, the spindle rotation rate is varied to dispense a fixed volume of the lubricant substantially over the circumferential surface of the threads of the spindle and/or drill rod. The lubricant dispensing rate may be controlled as a function of spindle diameter and a preestablished spindle rotation rate.

Dispensing the lubricant, according to this embodiment, may involve spraying the lubricant onto the threads of the spindle and/or the drill rod. In an alternative embodiment, dispensing the lubricant involves communicating the lubricant through a passageway defined within the spindle to one or more apertures defined within the threads of the spindle and/or the drill rod. The lubrication dispensing methodology may also include heating the lubricant. The applicator may constitute a spray applicator, an applicator that contacts the threads, or an aperture defined within a region of the threads which communicates the lubricant to the threads received from a passageway defined within the spindle.

According to a further embodiment, each drill rod is provided with a lubricant supply conduit extending axially along the length of the rod. The axially extending lubricant supply conduit may be a bore defined within a wall of the rod which extends along the length of the rod. The lubricant supply conduit may alternatively be disposed along an inner or outer diameter surface of the rod. One or more apertures are provided within the thread area of the rod which extend to the lubricant supply conduit of the rod. When a rod is threaded onto the spindle, the aperture(s) of the spindle are fluidly coupled to the axially extending lubricant supply conduit of the drill rod. Lubricant is communicated through the spindle aperture, through the spindle/rod fluid interface, and along the length of the drill rod via the lubricant supply conduit of the drill rod.

During a rod unloading operation, the rod-to-rod joint proximate the vice clamping mechanism is broken. As this joint is broken during the unthreading procedure, lubricant is forced into the rod-to-rod threaded interface, which assists in the separating the two rods with minimal heat and mechanical stress. After the rod-to-rod joint is broken, the clamping mechanism clamps the rod thereby temporarily preventing further rod rotation. The spindle-to-rod joint is then broken while being subject to automatic lubrication in a manner previously described. After unthreading the spindle from the rod, the clamping mechanism releases the rod and the rod is removed from the carriage and transferred to the rod magazine.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 8 is a detailed view of a portion of the hydraulic schematic of FIG. 7 showing hydraulic connections between the HDD hydraulic circuit and the lubricant dispensing system;

FIG. 15 illustrates a lubricant dispensing system which communicates a lubricant along an axially extending conduit provided on a drill rod in accordance with an embodiment of the present invention.

Figure 1:
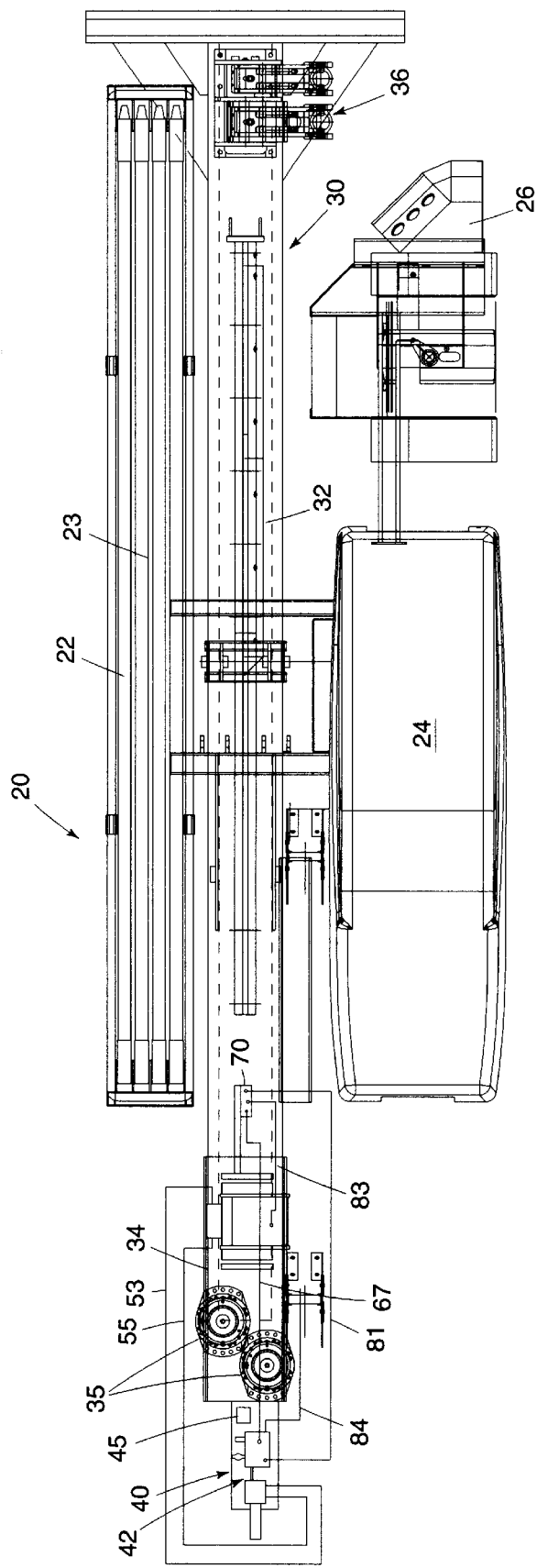
FIGS. 1 and 2 are top and side views, respectively, of an underground boring apparatus which employs a lubricant dispensing system and method in accordance with an embodiment of the present invention.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Systems and methods of the present invention provide for the automatic dispensing of a lubricant to threads of a drill stem, alternatively referred to as a spindle or drive chuck, and/or to threads of a rod to be added to or removed from a drill string. Initiating a lubrication operation and dispensing of the lubricant may be accomplished in several different ways, including manually, electronically, hydraulically, pneumatically, mechanically, or a combination of these approaches.

A lubricant may be dispensed external to the rod/spindle threads using various approaches, such as by use of a spray application technique (e.g., air or airless spraying approach) or through use of an applicator which contacts rod/spindle threads directly (e.g., a brush, pad or other direct contact wiping member). A lubricant may also be dispensed to the spindle threads using various approaches internal to the spindle mechanism. For example, a fluid passageway may be provided within the spindle which extends from an outer surface of the spindle toward the threads of the spindle. One or more outlets may be provided that extend between the threaded exterior of the spindle and the fluid passageway. A lubricant may be dispensed to the spindle threads by communicating the lubricant through the fluid passageway and the outlets.

The temperature of the lubricant may be controlled to obtain desired dispensing characteristics. The viscosity of the lubricant, for example, may be modified by appropriately controlling the temperature of the lubricant. The lubricant may be heated by use of a heat source provided on, or external to, the HDD machine. The lubricant dispensing unit may employ one or several heat sources (or cooling sources) provided at different sections of the dispensing unit to alter the temperature of the lubricant.

The volume of lubricant dispensed to the spindle/rod threads may be fixed or variable. A fixed volume of lubricant may be dispensed for a predetermined duration of time. The volume of lubricant and dispensing duration are typically selected to provide complete coverage of the threads with lubricant during one complete revolution of the spindle threads. A fixed volume of lubricant may be dispensed at a variable rate, such as in response to an increase or decrease in spindle/rod rotation rate.

In accordance with an embodiment in which the lubricant is sprayed onto the spindle/rod threads, the cross-section and/or length of the spray pattern may be adjusted to achieve a desired degree of coverage. The duration of spray time may be controlled, and may be regulated as a function of spindle/rod rotation rate. The volume of lubricant and spray duration may be controlled as a function of the size and/or rotation rate of the spindle/rod threads. The volume of grease applied to the spindle/rod threads may be varied during application, so as to coat a variable amount of the circumference of the threads with lubricant. The orifice of the spray nozzle used to dispense the lubricant may also be varied to enhance the control of the automated lubrication process.

A lubricant dispensing system of the present invention may be implemented on an HDD machine that employs an automated rod loader device. The controlled dispensing of lubricant to a threaded interface between the spindle and a drill rod during rod loading and unloading operations may be coordinated by a controller of the HDD machine. The automated lubricant dispensing system of the present invention may be employed on or in connection with the automated drill rod loading device disclosed in commonly owned U.S. Pat. No. 5,556,253, which is hereby incorporated herein in its entirety.

Figure 2:
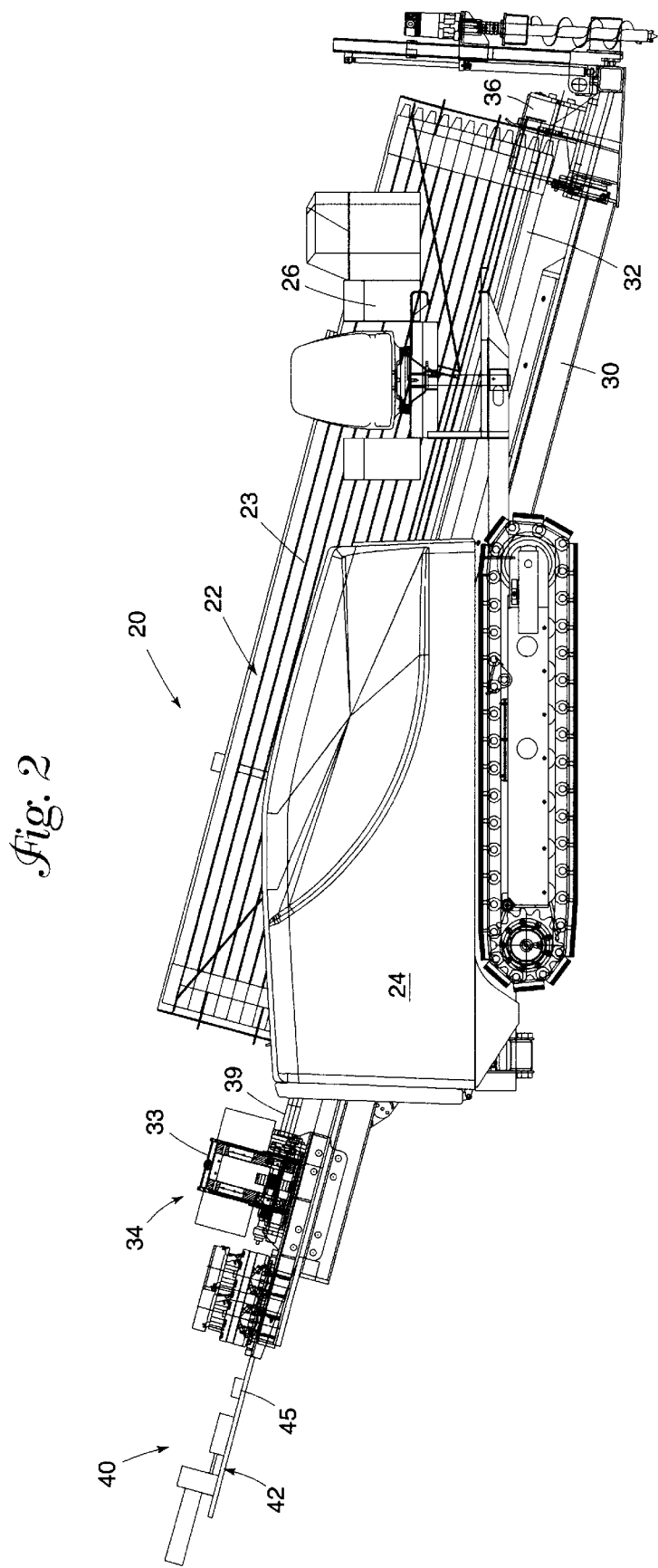

Referring now to the figures and, more particularly to FIGS. 1 and 2, there is illustrated an embodiment of a horizontal directional drilling (HDD) machine 20 which incorporates an automatic lubricant dispensing system and methodology for use during a rod loading or unloading operation. FIGS. 1 and 2 are top and side views of an HDD machine 20, respectively, on which is mounted a lubricant dispensing system 40 of the present invention. HDD machine 20, in general terms, is situated aboveground and includes a frame 30 on which a gearbox 34 is movably mounted. HDD machine 20 further includes a magazine 22 within which a number of drill rods 23 are supported. An engine 24 provides power for a track drive 25 and the hydraulic pumps/motors of HDD machine 20. An operator console 26 is provided with various controls, switches, and displays that allow an operator to operate the HDD machine 20 and lubricant dispensing system of the present invention.

HDD machine 20 includes thrust/pullback pumps 35 for driving gearbox 34 and a drill string made-up of several drill rods 23 in a forward and/or reverse longitudinal direction. Situated on gearbox 34 are rotation motors or pumps 33, which are used to rotate a spindle 39, also referred to as a drill stem or drive chuck, of the gearbox 34. In operation, the rotation motors 33 and thrust/pullback pumps 35 respectively rotate and displace the gearbox 34, spindle 39, and the drill string, which has a cutting head or reamer attached at the end thereto, during boring and/or reaming operations.

A typical boring operation takes place as follows. The rotation motors 33 are initially positioned in an upper location on frame 30 and rotate the drill string. While the drill string is rotated, the rotation motors 33 and drill string are pushed in a forward direction by the thrust/pullback pumps 35 toward a lower position to create a borehole. The drill string may also be thrusted forward without being rotated. The rotation motors 33 reach a lower position when the drill string has been pushed into the borehole by the length of one drill rod 23. With the rotation motors 33 situated at the lower position, a clamp mechanism 36 grips the drill string to stop all downhole drill string movement. A clamp sensor senses actuation of clamp mechanism 36 and generates a clamp signal when the clamp mechanism 36 properly engages the drill string.

The spindle 39 is then uncoupled from the clamped drill string and the gearbox 34 is pulled back to the upper frame location. A new drill rod 23 is obtained from the magazine 22 and added to the drill string. The clamping mechanism 36 then releases the drill string and the thrust/pullback pumps 35 drive the drill string and newly added rod 23 into the borehole. The rotation motors 33 are thus used to thread and unthread a drill rod 23 to/from the drill string during boring and backreaming operations, respectively. Exemplary systems and methods for controlling an HDD machine of the type generally illustrated in the figures are disclosed in commonly assigned U.S. Pat. Nos. 5,746,278 and 5,720,354, and U.S. application Ser. Nos. 09/405,890 and 09/405,889 filed concurrently on Sep. 24, 1999; all of which are hereby incorporated herein by reference in their respective entireties.

The HDD machine 20 shown in FIGS. 1 and 2 is equipped with a lubricant dispensing system 40 implemented in accordance with an embodiment of the present invention. The lubricant dispensing system 40 is situated proximate a location in which spindle/drill rod threading and unthreading occurs. In FIGS. 1 and 2, the lubricant dispensing system 40 is shown mounted to the gearbox 34 of the HDD machine 20. In this configuration, the lubricant dispensing system 40 moves with gearbox 34 along an axis parallel to frame 30.

The lubricant dispensing system 40, according to one embodiment of the present invention, includes a pump and metering block 42, a spray block 70 coupled to the pump and metering block 42, and a logic module or unit 45. The spray block 70 is situated in proximity to the location of spindle/rod threading and unthreading by a support 77 (shown in FIG. 3). A lubricant supply line 67 communicates lubricant between the pump and metering block 42 and the spray block 70. The pump and metering block 42 communicates a volume of lubricant to the spray block 70 via lubricant supply line 67 at a relatively high pressure (e.g., 4500 psi). At the appropriate time, and for a predetermined duration of time as determined by logic module 45, the lubricant is dispensed from spray block 70 to the spindle/rod threads during a threading or unthreading operation.

Figure 3:
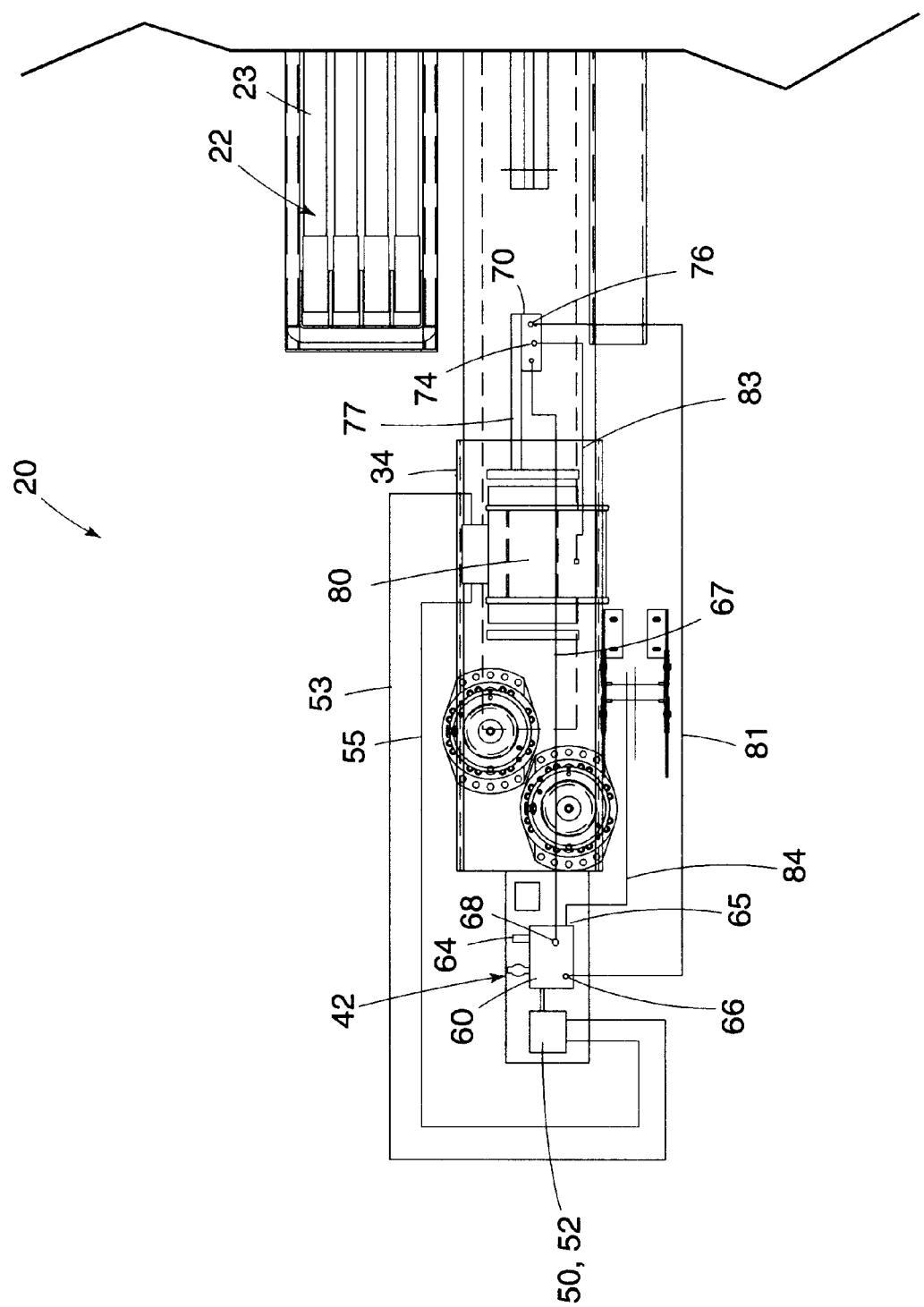
FIG. 3 is a top view of an underground boring apparatus which employs a lubricant dispensing system and method provided with a heating system in accordance with one embodiment of the present invention.

FIG. 3 is a top view of an HDD machine 20 which includes a lubricant dispensing system 40 provided with temperature control in accordance with another embodiment of the present invention. Regulating the temperature of the lubricant advantageously provides for adjustment of various characteristics of the lubricant, such as viscosity. The temperature of the lubricant may be controlled by the logic unit 45 or other controller of the HDD machine 20.

According to this embodiment, the lubricant dispensing system 40 includes a pump 50 and lubricant reservoir 52 coupled to a metering block 60. The pump 50 may be implemented as a hydraulic pump which is powered by hydraulic fluid passing from a charged pressure line 55, through the pump 50, and to a return line 53. The source of the hydraulic fluid is preferably the thrust/pullback and/or rotation motors or pumps 35, 33 of the HDD machine 20. It is understood that pump 50 may be a pneumatic pump or an electric pump, in which case the pump 50 is respectively powered by pressurized air or electricity. The source of pump power is preferably provided on the HDD machine 20, but may be provided external to the HDD machine 20.

The metering block 60 includes a fluid inlet 66 and a fluid outlet 68 through which a heat transfer fluid passes. The heat transfer fluid, in this embodiment, constitutes oil contained within the gearbox 34. The gearbox oil is typically at an elevated temperature relative to ambient temperature during a HDD machine operation. The temperature of the gearbox oil typically ranges between about ambient and 210° F.

In one embodiment, a supply line 81 and return line 84 provide for the communication of gearbox oil between the fluid inlet 66, fluid outlet 68, and an oil reservoir within gearbox 34. In this configuration, only the metering block 60 is provided with a heat source.

According to another embodiment, and as shown in FIG. 3, a heat source is provided for both the metering block 60 and the spray block 70. Spray block 70 includes a fluid inlet 74 which receives supply oil from the gearbox 34 via supply line 83. Gearbox oil flows through spray block 70 to supply line 81 via fluid outlet 76. The gearbox oil communicated through supply line 81 from fluid outlet 76 of spray block 70 passes into metering block 60 via fluid inlet 66. The gearbox oil passing through metering block 60 is then returned to the gearbox reservoir via fluid outlet 68 and return line 84. It is understood that spray block 70 and pump and metering block 42 may each be provided with gearbox heating oil via independent pairs of supply and return lines. The various supply and return lines shown in FIG. 3 may be insulated to enhance thermal control of the gearbox oil. The lubrication supply line shown coupled between lubricant outlet 68 of the metering block 60 and spray block 70 may also be insulated.

Figure 4:
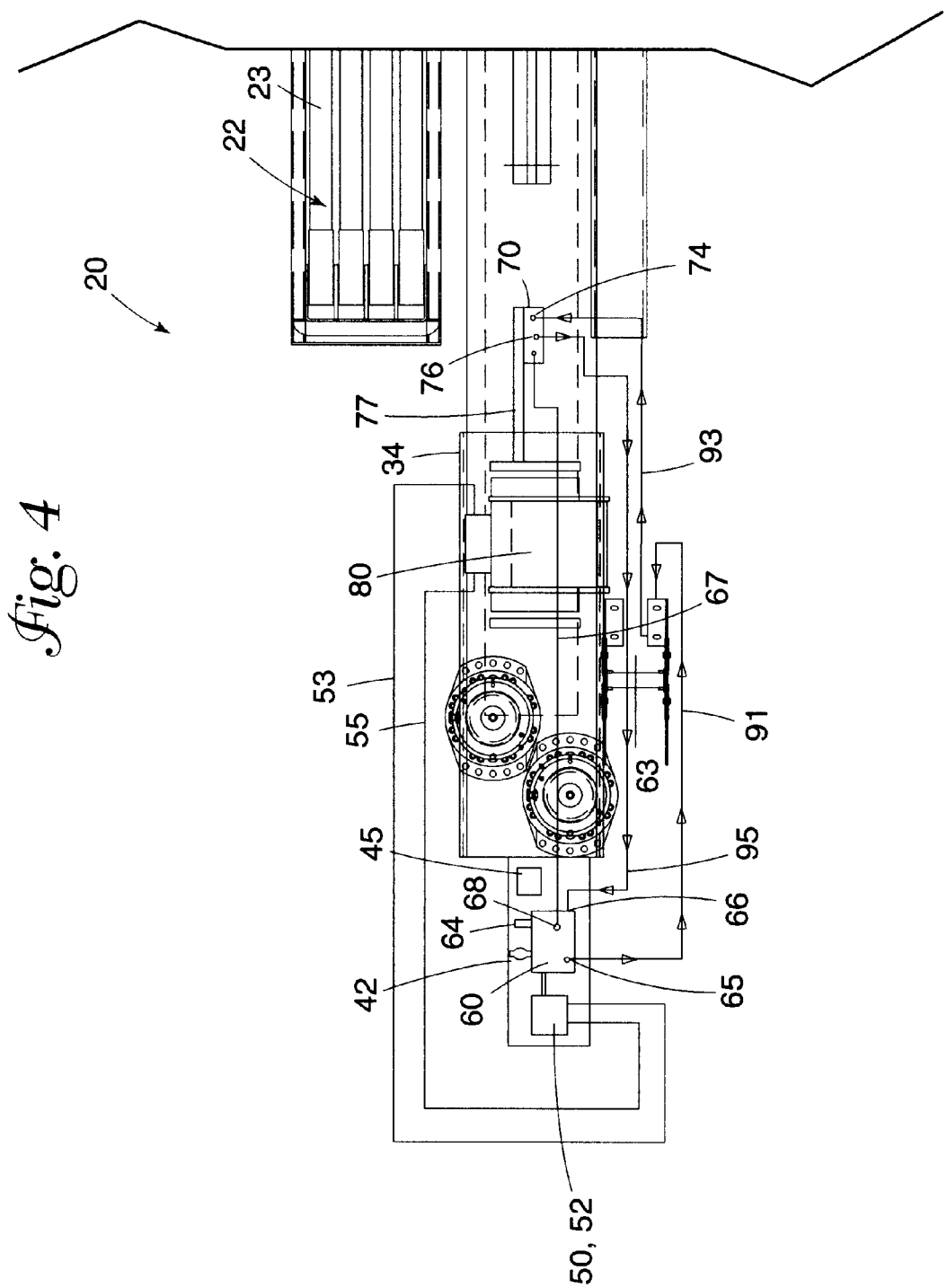
FIG. 4 is a top view of an underground boring apparatus which employs a lubricant dispensing system and method provided with a heating system in accordance with another embodiment of the present invention.

FIG. 4 illustrates another embodiment of a lubricant dispensing system 40 which provides for heating of a lubricant at one or both of the spray block 70 and the pump and metering block 42. According to this embodiment, the lubricant is heated by a heat transfer fluid provided by the cooling system of an engine 24 of the HDD machine 20. The heat transfer fluid, in this case, is preferably the engine coolant which is used to regulate the temperature of the engine 24 during operation. As shown in FIG. 4, the engine coolant is supplied to the spray block 70 through supply line 93, passes through spray block 70 via fluid inlet and outlet 74, 76, and is communicated to metering block 60 via supply line 95. The engine coolant passing through metering block 60 is returned to the cooling system of the engine 24 via return line 91. It is understood that spray block 70 and metering block 60 may each be provided with engine coolant via independent pairs of supply and return lines.

Figure 5:
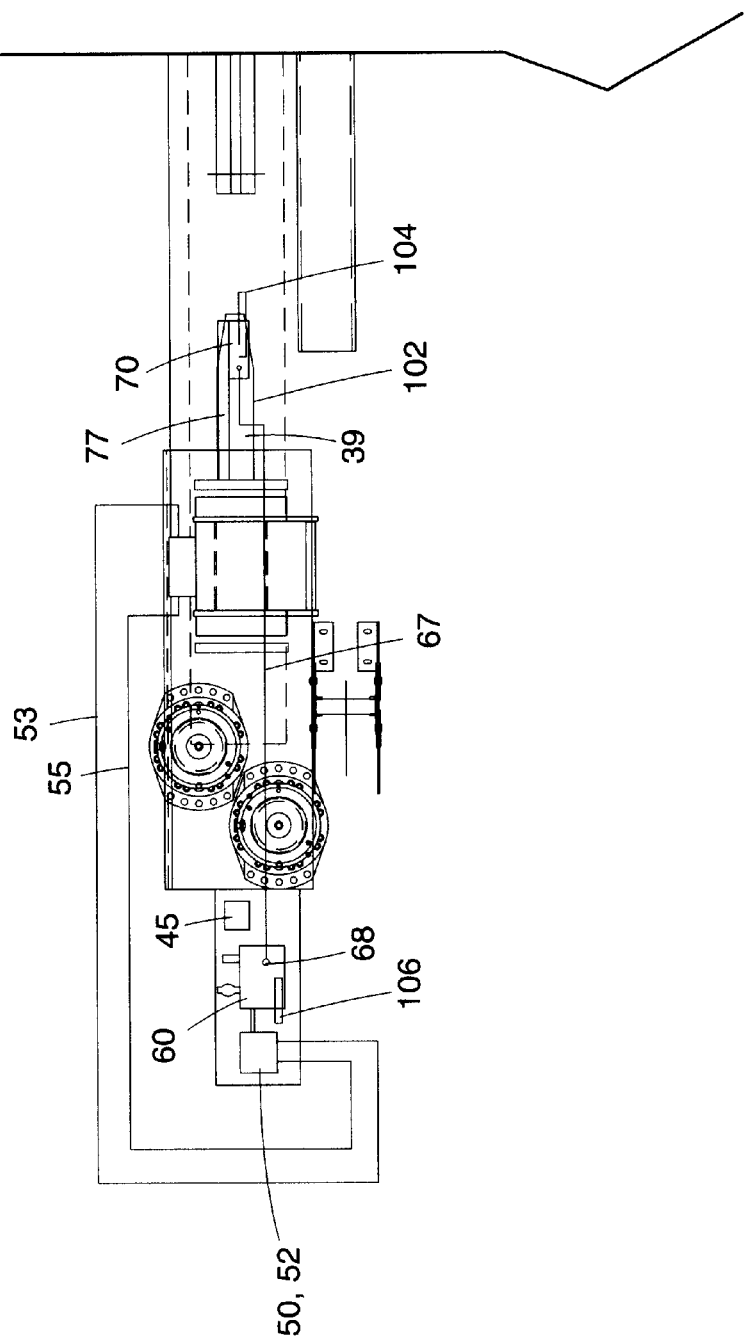
FIG. 5 is a top view of an underground boring apparatus which employs a lubricant dispensing system and method provided with a heating system in accordance with a further embodiment of the present invention.

FIG. 5 illustrates yet another embodiment of a lubricant dispensing system 40 which provides for heating of a lubricant at one or both of the spray block 70 and the pump and metering block 42. According to this embodiment, the lubricant is heated by use of an electrical heating element 106 coupled to the metering block 60. The spray block 70 may also be provided with an electrical heating element 104. A generator of the HDD machine 20 preferably provides electrical power for the electrical heating elements 106, 104. The lubricant supply line 67 may be wrapped with an electrical heater wrap (not shown) to enhance thermal control of the lubricant communicated between the metering block 70 and spray block 70. As in the embodiments depicted in FIGS. 3 and 4, the temperature of the lubricant may be controlled by the logic unit 45 or by a controller or processor on board the HDD machine 20.

Figure 6:
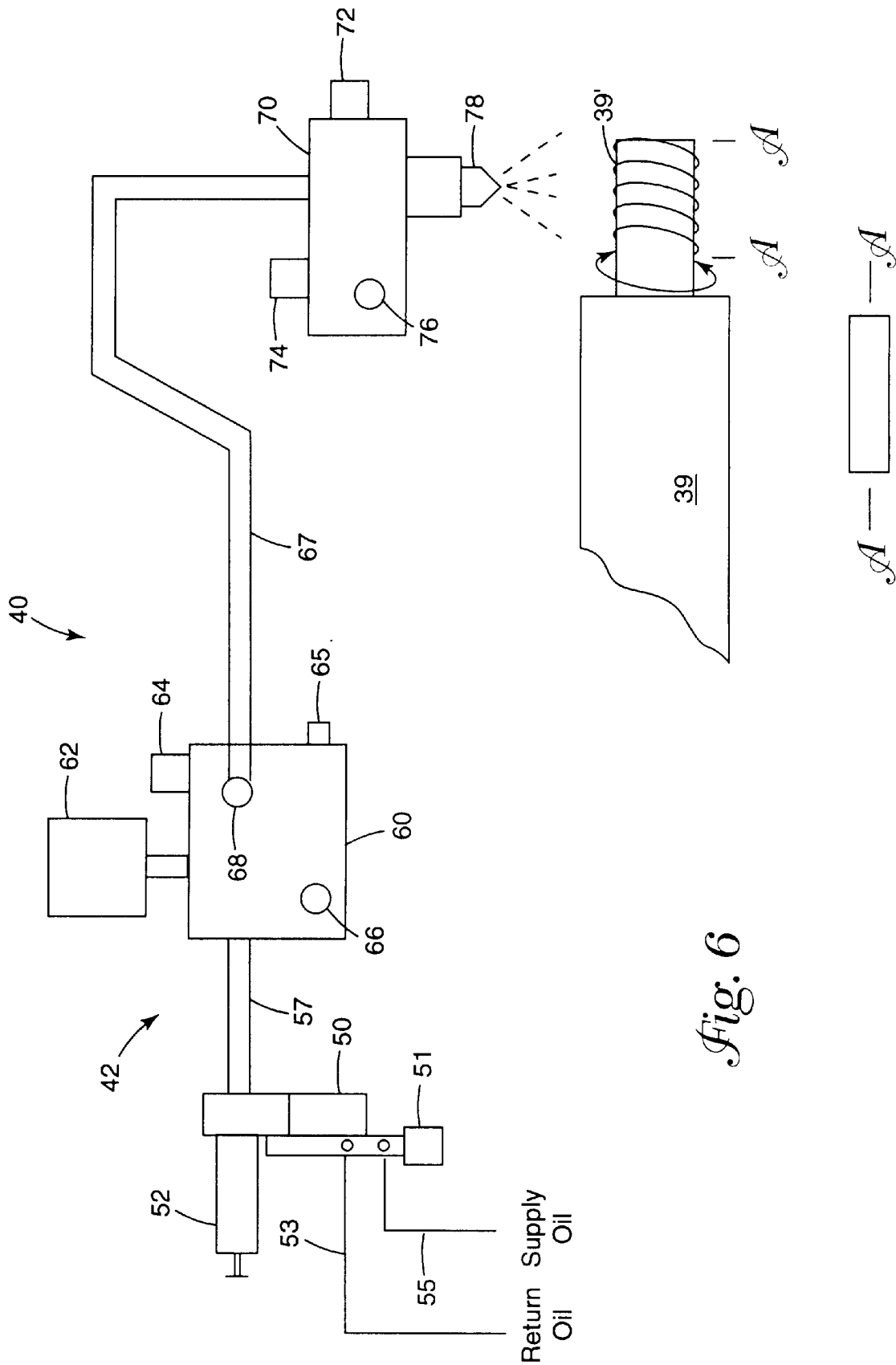
FIG. 6 illustrates a lubricant dispensing system in accordance with one embodiment of the present invention.
Figure 7A:
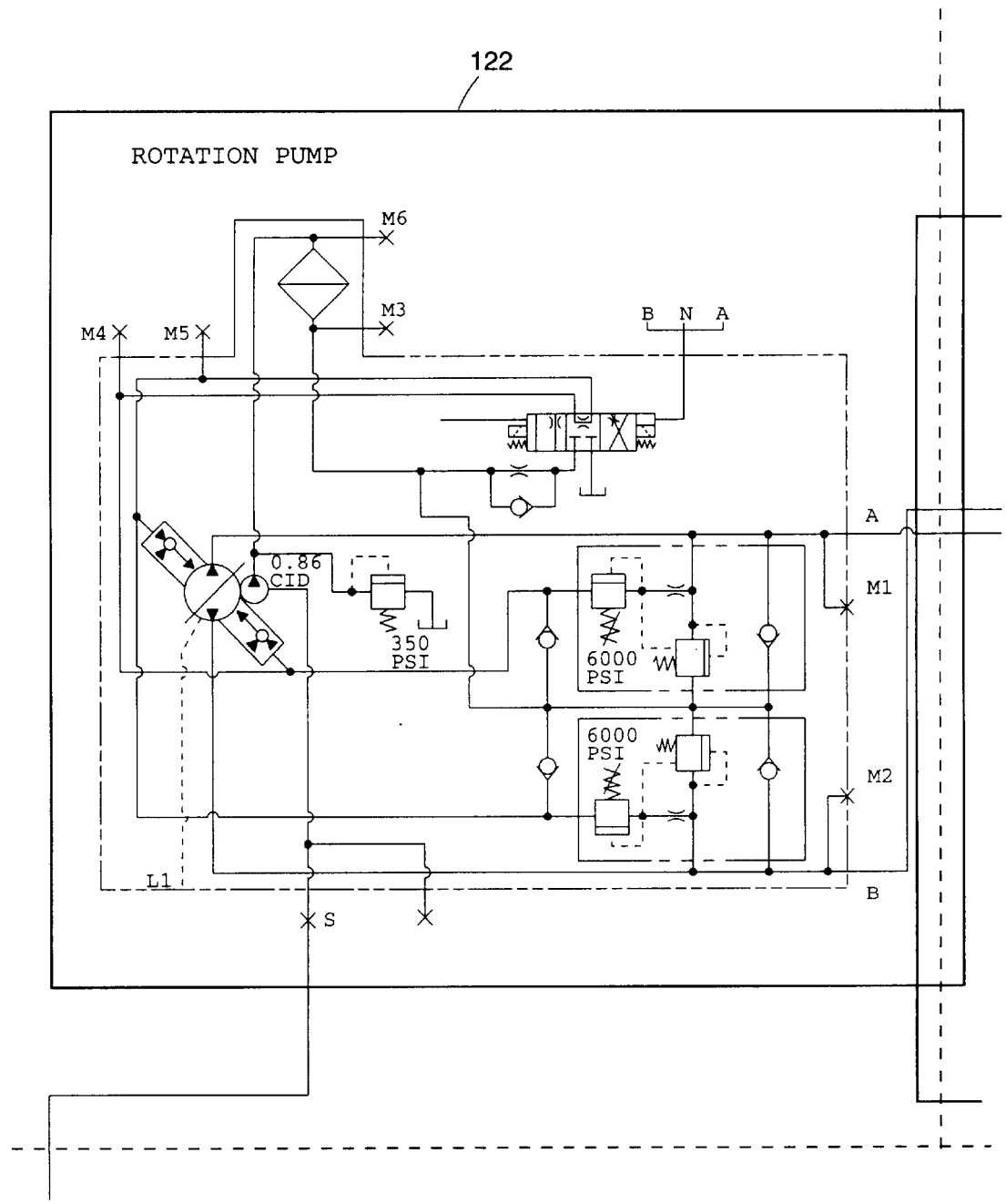
FIG. 7 is a hydraulic schematic of an HDD machine which provides power to a lubricant dispensing system in accordance with an embodiment of the present invention.
Figure 7B:
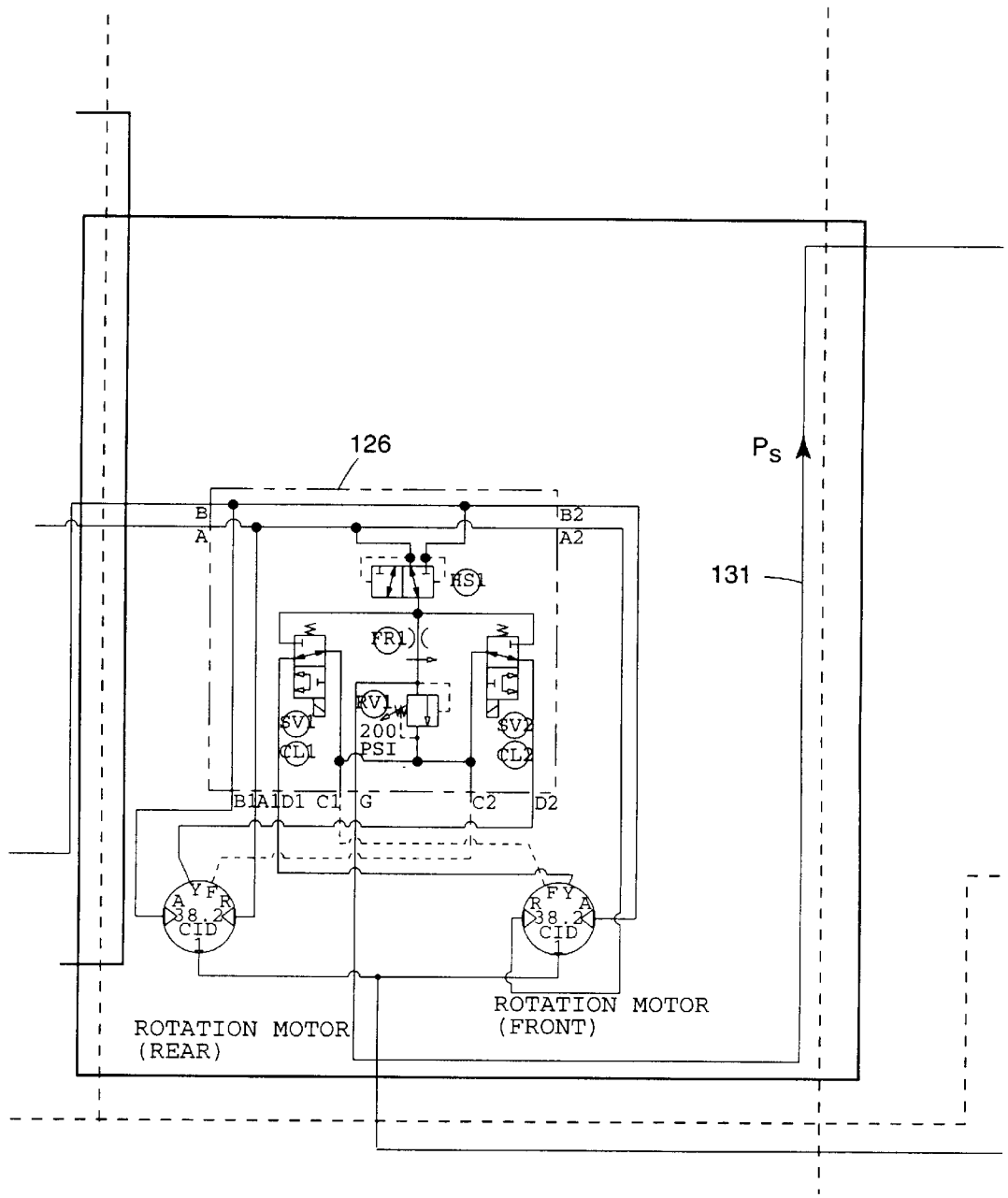
Figure 7C:
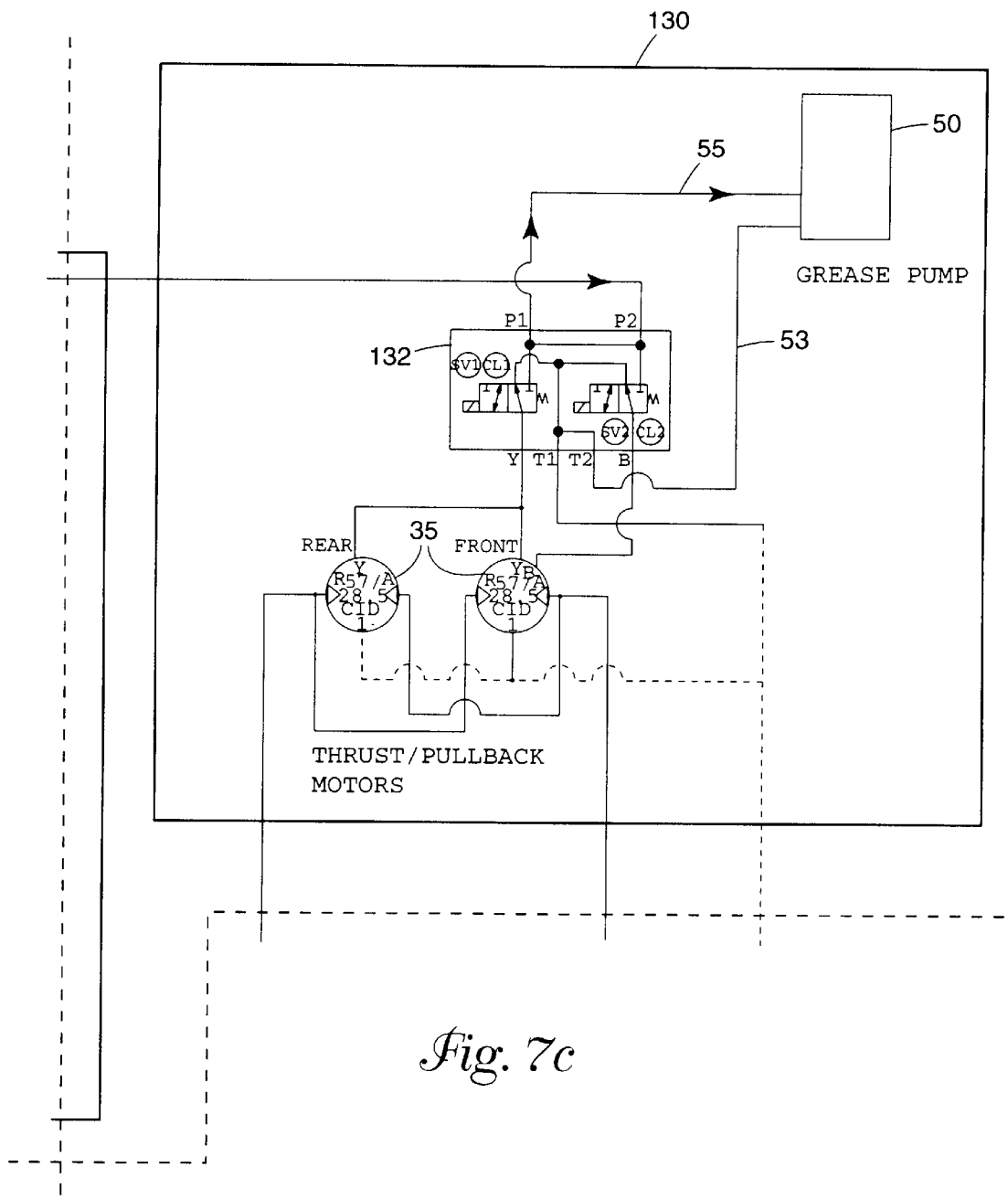
Figure 7D:
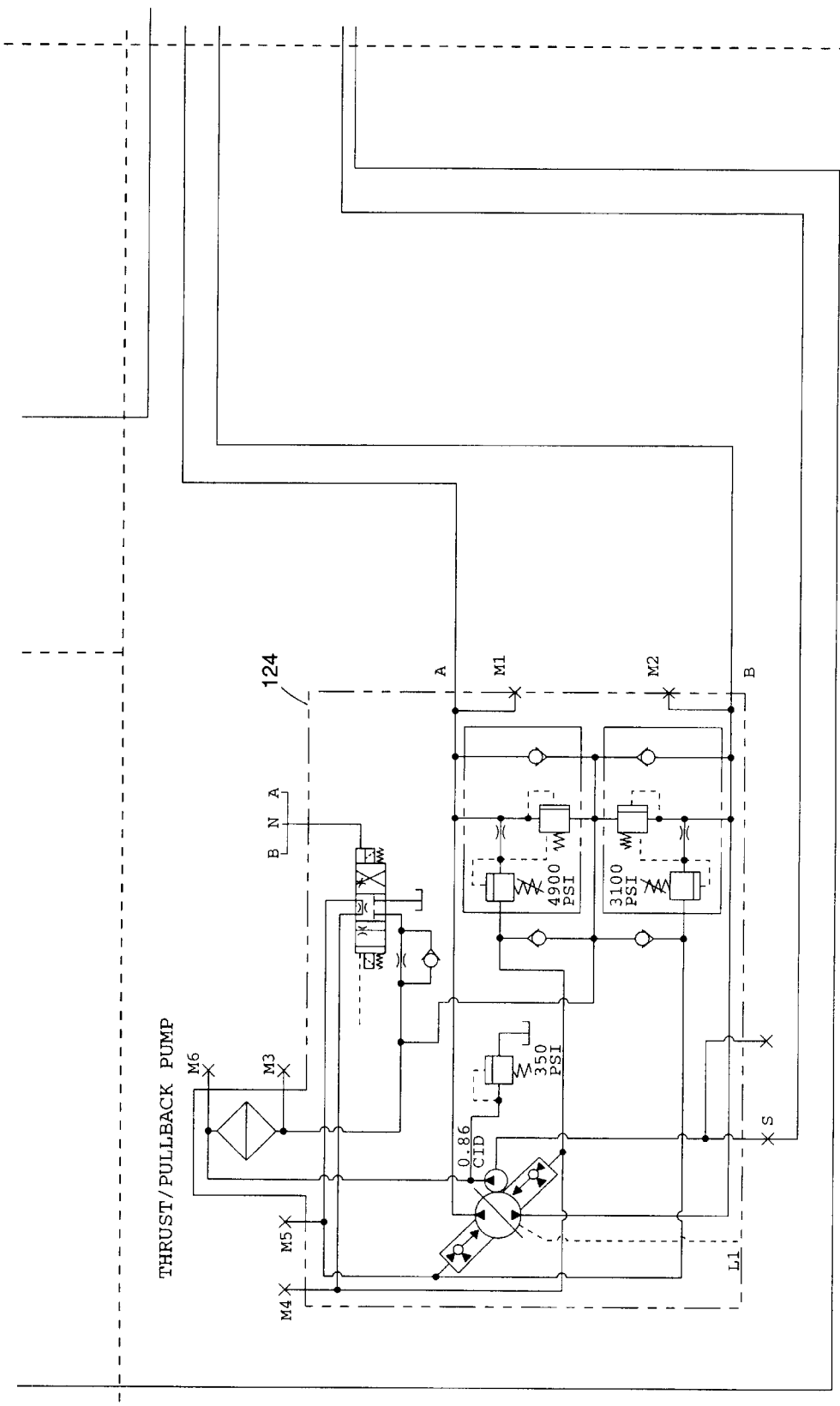
Figure 7E:
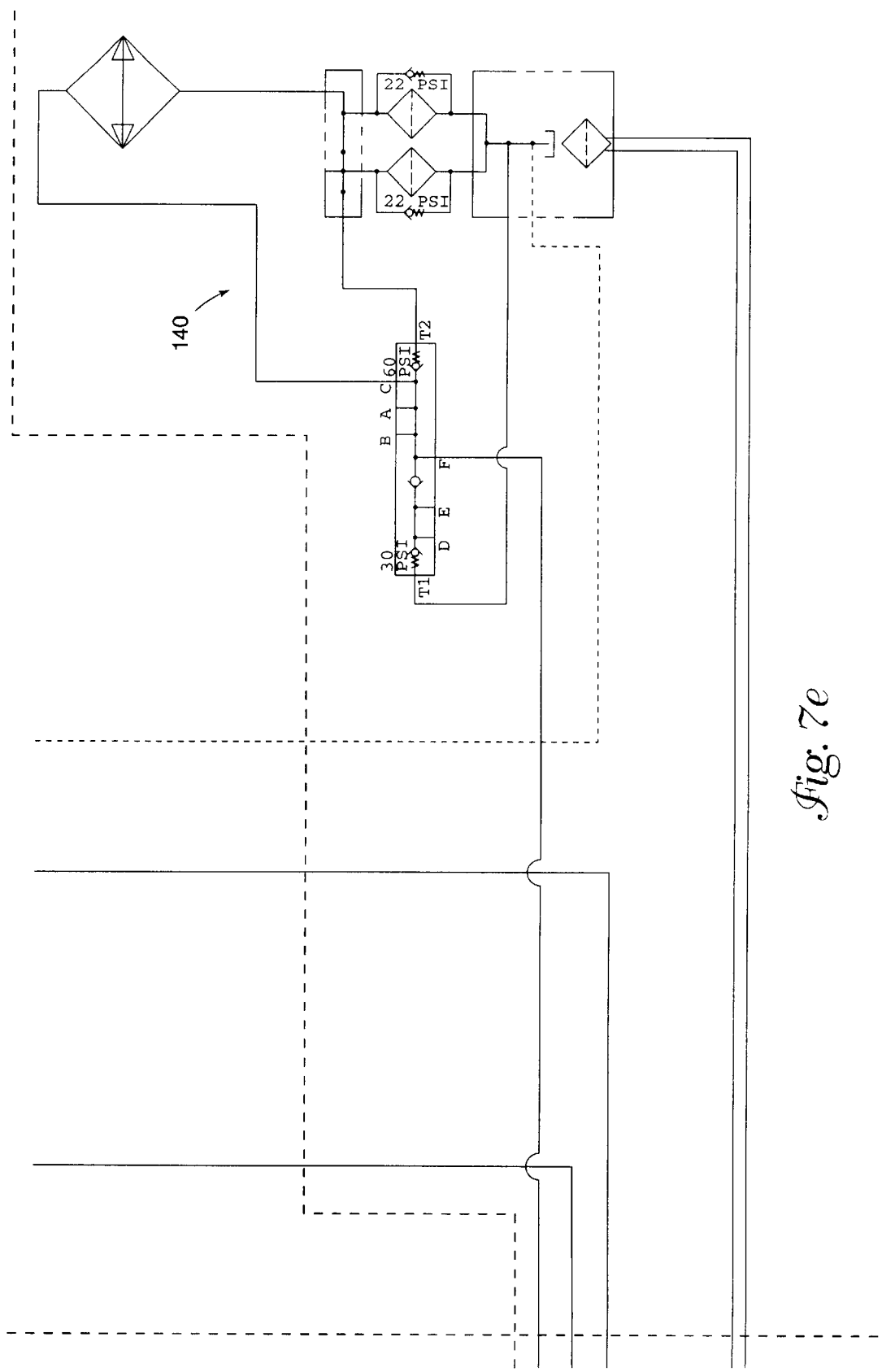

FIG. 6 is a block diagram of a lubricant dispensing system 40 according to one embodiment of the present invention. In this embodiment, the lubricant dispensing system 40 includes a hydraulic pump 50 which is coupled to a grease reservoir 52 and a measuring valve assembly 60. The hydraulic pump 50 may be a double acting, single shot hydraulic pump.

Hydraulic pump 50 receives hydraulic fluid via a supply line 55 and returns hydraulic fluid via a return line 53. A solenoid 51, which is preferably a timed solenoid, controls charging of pump 50. The solenoid energizes and de-energizes the pump 50 in order to pressurize the lubricant in supply line 57 and metering block 60 to several thousand pounds per square inch (psi). The lubricant is typically pre-charged to a pressure of about 4500 psi, but may be charged to pressures ranging between 3000 and 10,000 psi. The metering block 60 includes an accumulator 62 which is sized to provide a desired volume of lubricant, such that the supply pressure remains approximately constant during a complete duration of the spraying cycle.

A pressure sensor 64 senses pressure of the lubricant within the metering block 60. When a predetermined pressure threshold is reached, the pressure sensor 64 transmits a readiness signal to the logic unit 45 (not shown in FIG. 6). The readiness signal produced by the pressure sensor 64 may be transmitted to an indicator (e.g., light, LED, speaker, or vibratory device) and/or to a controller of the HDD machine 20.

In response to the readiness signal, an operator or the HDD controller may activate a spray control solenoid 72 provided on the spray block 70. The spray control solenoid 72 is preferably a timed solenoid. Upon activation of solenoid 72, the pressurized lubricant is dispensed from the metering block 60 and supply line 67 to the threads of the spindle 39 and/or rod threads via nozzle 78 of spray block 70.

By way of example, a given spindle 39 may have a diameter of about 1.58 inches and threads having an axial length of about 2.19 inches. At a spindle rate of 190 RPM, which in this case is 3.17 revolutions per second, and assuming a spray distance of about 10 inches between the nozzle 78 and spindle 39, a conservative estimate of the volume of grease needed to coat the entire circumferential threaded surface of the spindle is approximately 2.38in$^3$. This volume of grease can likely be reduced and yet provide sufficient coverage of lubricant on the threaded surface of the spindle 39.

FIG. 7 is a schematic of a hydraulic circuit 120 of an HDD machine 20 which includes a hydraulically powered lubricant dispensing system 40. Hydraulic circuit 120 includes a rotation pump circuit 122, a thrust/pullback pump circuit 124, a three-speed lubrication flush valve circuit 126, a lubrication dispensing system circuit 130, and a filtration tank circuit 140. The hydraulic system of the HDD machine 20 is used to provide hydraulic power to pump 50. Although the supply and return lines 55, 53 of the hydraulic pump 50 are shown connected to particular connections in hydraulic circuit 120, other suitable supply and return connections may be used.

As shown in FIGS. 7 and 8, pressurized hydraulic fluid is supplied to pump 50 from the rotation pump and lubrication flush valve circuits 122, 126 via supply line 131. Supply line 131 is pressurized to a pressure, $P_s$, on the order of several hundred psi. The pressure, $P_s$, which is referred to as a standby pressure, may range between 300 and 500 psi.

Hydraulic fluid is communicated to a 2-way brake valve 132 of the lubrication dispensing system circuit 130. Solenoids of the 2-way brake valve 132 control the flow of pressurized hydraulic fluid to pump 50 via supply line 55. As was discussed previously with reference to FIG. 6, a solenoid 51 of pump 50 controls the build-up of pump pressure in the metering block 60 from several hundreds of psi to several thousands of psi.

Figure 9:
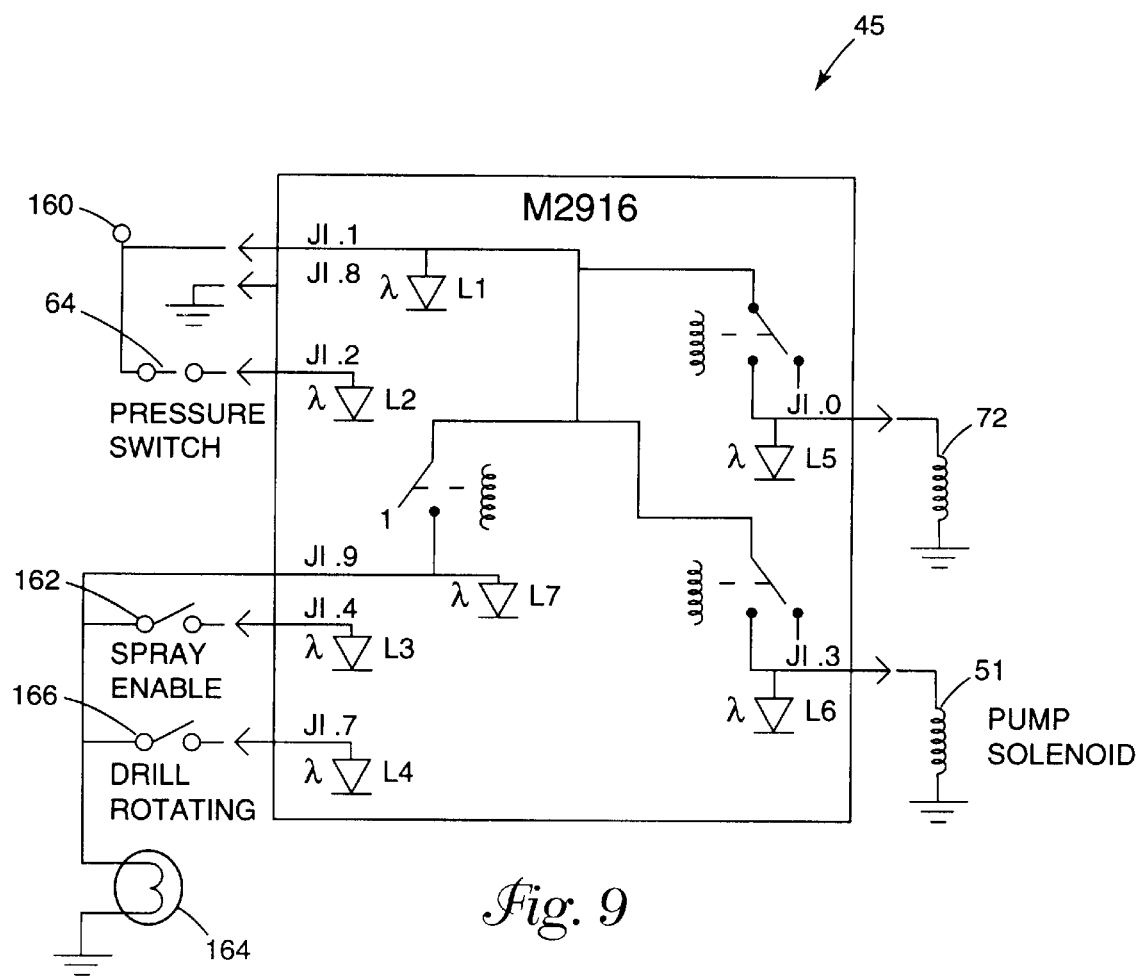
FIG. 9 is an electrical schematic of a control module that control a lubricant dispensing system of the present invention during threading and unthreading operations.

FIG. 9 is an electrical schematic of a logic module 45 that may be employed to control a sequence of operations to provide for automated dispensing of a lubricant to spindle and/or rod threads. A 12 volt power source 160 supplies power to the logic module 45. The logic module 45 allows the pump solenoid 51 to close for a set period of time and then open for a set period of time to pump lubricant into the metering block 60. This sequence is continued until the pressure of the lubricant in the metering block 60 reaches a specified pressure threshold. When the pressure threshold is reached, a pressure switch 64 on the metering block 60 opens and transmits a signal to illuminate a light 164 of a spray switch 162 provided on the operator console 26. Illumination of the light 164 indicates that the lubricant dispensing system 40 is pre-charged and ready for activation.

The operator then initiates rotation of the spindle 39, which closes rotation switch 166, and enables the spray switch 162 on the operator console 26. Manual activation of spray switch 162 causes spray control solenoid 72 on the spray block 70 to activate. Alternatively, the HDD machine controller may activate the spray control solenoid 72. Activation of the spray switch 166 causes spray control solenoid 72 to open for a predetermined duration of time during which lubricant is dispensed to the threaded area of interest. Once the spray solenoid 72 is closed, the above-described sequence is re-initiated.

Figure 10:
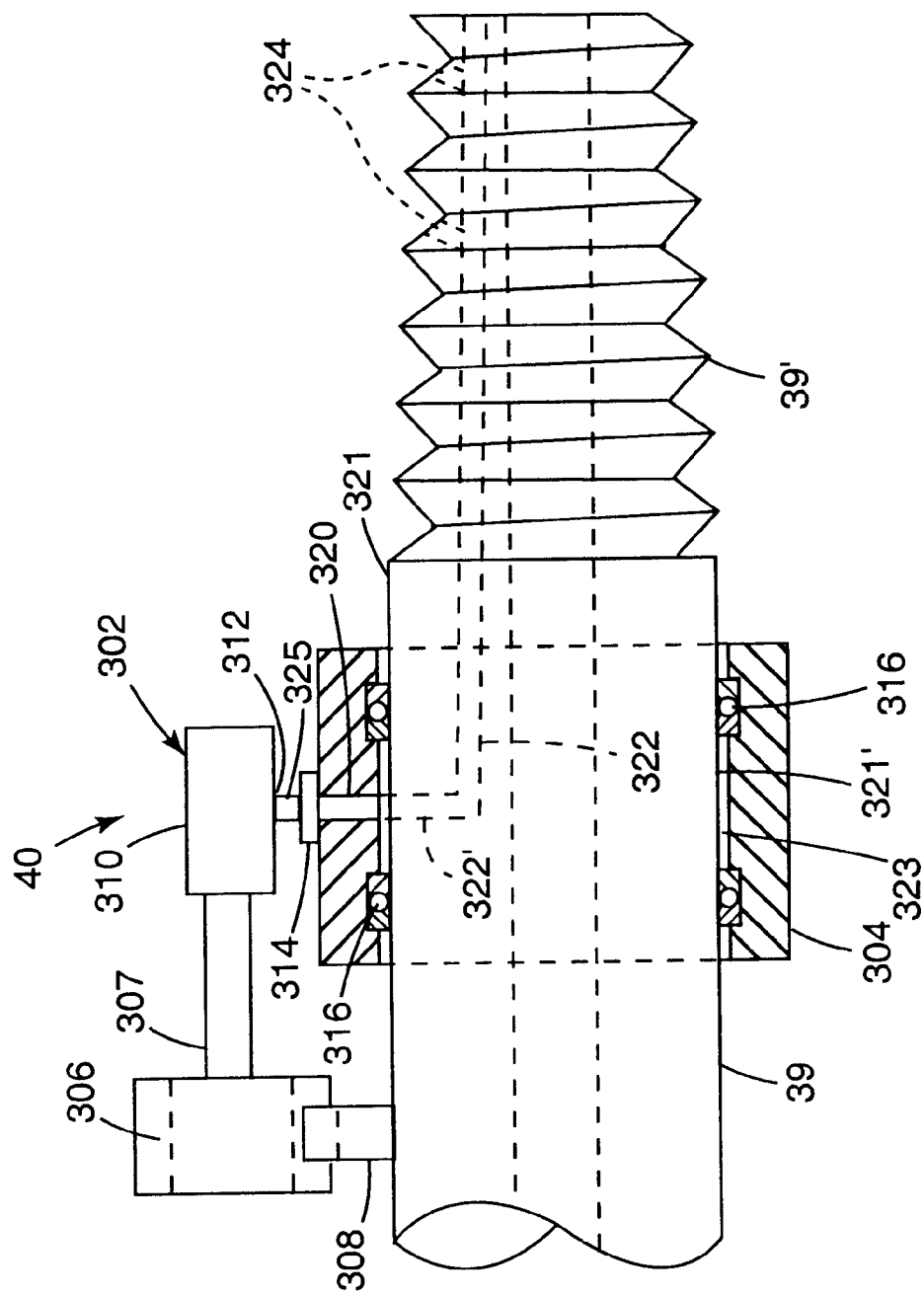
FIG. 10 illustrates a lubricant dispensing system in accordance with another embodiment of the present invention.

In accordance with another embodiment of the present invention, and as shown in FIG. 10, a lubricant dispensing system 40 may communicate a lubricant to threads of a spindle and/or a drill rod through a lubricant supply passageway provided within the spindle 39. According to this embodiment, a passageway 322 is provided within the spindle 39. One or more outlets 324 are provided within the thread region 39' of the spindle 39. The outlets 324 are typically drill-out passageways within the thread region 39' which connect with the main passageway 322 extending from an outer surface 321 of the spindle 39 and passing through an internal portion of the spindle 39. A lubricant is pumped into the main passageway 322, typically at low pressure, and is communicated to the exterior thread region 39' via outlets 324.

In one configuration, the lubricant dispensing system 40 shown in FIG. 10 includes a mechanically driven pump 302 which pumps a lubricant into the passageway 322 at a low pressure, such as in the range of about 5 psi to 200 psi, but higher pressures limited only by pump limitations may be employed. Dispensing a lubricant at low pressure in the manner depicted in FIG. 10 advantageously simplifies the complexity of the lubricant pumping mechanism. A low pressure system of this type has sufficient flow rate capacity; for example lubricant volumes of about 0.023in$^3$ are sufficient to adequately coat a spindle/rod thread region in many applications.

In the embodiment shown in FIG. 10, a lubricant transfer collar includes a collar 304 which mates with an outer surface 321 of the spindle 39 by use of a pair of annular O-rings 316. The O-rings 316 are situated on either side of the entry location of the lubricant supply passageway 322 on the surface 321' of the spindle 39. The collar 304 also includes a circumferential slot 320 which includes an annular O-ring seal. The pair of O-rings 316 and inner surface of collar 304 therebetween form an annular channel 323 through which a lubricant may flow via O-ring sealed slot 320. Lubricant that is pumped into the annular channel 323 is communicated through one or more passageways 322' that extend from the outer surface 321' of the spindle 39 to one or more main passageways 322, only one of which is depicted in FIG. 10.

The mechanically driven pump 302 includes an outlet 312 that engages the lubricant transfer conduit 325 which transfers the lubricant to the collar 304. The pump 302, upon activation, pumps the lubricant into the annular channel 323 via pump outlet 312, lubricant transfer conduit 325, collar inlet 314, and O-ring sealed slot 320. The pump 302, in one embodiment, constitutes a mechanical grease pump which is driven by a gearbox 306 and shaft 307. In another embodiment, the pump 302 may be implemented using a single shot pump similar to that previously described. In this implementation, the pressure requirement is much lower than that associated with a spray delivery technique, such as in the range of about 5 psi to 200 psi, and the requirement of lubricant temperature control may be significantly reduced or eliminated.

In one operating scenario, the pump 302 engages the collar 304 for purposes of dispensing a lubricant into the spindle passageway 322. The spindle 39 is provided with one or more teeth 308 which engage teeth of a gear mechanism disposed in gearbox 306. When the spindle 39 is rotated, which occurs when making or breaking a threaded connection between the spindle 39 and a drill rod 23, as well as during boring operations, the spindle teeth 308 engage the gear mechanism of the gearbox 306 which powers mechanical pump 302. The volume of lubricant dispensed by pump 302 may be regulated to be proportional to the rate of spindle rotation. The pump 302 may be selectively driven to achieve a desired dispensing rate and volume by appropriately designing the interaction between the spindle teeth 308 and gear mechanism of gearbox 306. For example, the pump 302 may be driven to pump lubricant into collar 304, with insignificant back pressure, in a sufficient volume per revolution to adequately apply lubricant as the threads are being joined or separated. It may be designed, with an internal pressure relief, to operate at a set maximum pressure level, such that it can be operated continuously without requiring unacceptable power draw. It could alternatively be designed to continuously or intermittently dispense lubricant while the spindle 39 is rotating.

Additional control capabilities of the pump 302 may enhance the dispensing of lubricant to a threaded area during rod loading and unloading. For example, the supply of lubricant to the threads may be halted or prevented whenever the subject drill rod is torqued at the proper level. This may additionally be achieved by setting the maximum pressure such that whenever the joints are properly torqued the restriction is sufficient to eliminate flow. The pump 302 may be activated when a rod is loosened and removed from the drill string or when a new rod is threaded onto the drill string.

One particular advantage results from pumping lubricant at a relatively low pressure in accordance with this embodiment. Assuming that the pump 302 is enabled, such as when making or breaking a threaded connection between the spindle 39 and a drill rod (not shown), and is permitted to operate continuously during the period of enablement, the dispensing of lubricant from the pump 302 is dictated by the degree of contact between the threads 39' of the spindle 39 and those of the drill rod.

When threading the rod to the spindle 39, for example, lubricant is pumped to the threads 39' of the spindle until forced engagement of the spindle and rod threads covers apertures 324 within the spindle threads 39'. The force of the engaged threads is sufficient to overcome the pump force on the lubricant, thereby effectively shutting off the flow of lubricant. It is noted that rotation of the apertures 324 relative to the fixed threads of the drill rod acts to distribute the lubricant efficiently at the spindle-to-rod threaded interface.

When the rod is unthreaded from the spindle 39, and assuming the pump 302 is operating, lubricant begins to flow from apertures 324 when the pump force is greater than the counteracting force produced by spindle and rod engagement. As this joint is broken, the rotation of the spindle relative to the fixed drill rod acts to distribute the lubricant efficiently at the spindle-to-rod threaded interface. The pump 302 may be disabled, either automatically or manually, when the rotation of spindle 39 is terminated at the conclusion of a threading or unthreading operation.

The pump 302 may alternatively be activated hydraulically rather than mechanically, and may supply a single shot of grease to the threaded region 39' of spindle 39 as the spindle/rod joint is broken, so that the lubricant will be applied as the threaded joint is separated. Another shot of lubricant may be applied just prior to threading on a new rod to the spindle 39 to apply the lubricant to the threads 39'. This operation may be implemented in parallel with the operation of the rod loader and/or the upper vice to allow coordinated activation of pump 302. For example, pump 302 may be activated upon activation of the upper vice and/or upon activation of a rod loading operation.

In accordance with yet another embodiment of the present invention, and with reference to FIGS. 15A and 15B, spindle 39 includes a passageway that terminates in the threaded portion 39'. The spindle 39 may additionally include an annular ring 401 machined from one thread, and extending circumferentially around the spindle 39. This annular ring 401 may be provided such that it will ensure a fluid connection between the spindle passageway 322 and a drill rod passageway 402.

The drill rod passageway 402 terminates on both ends of the drill rod 23 within the threaded areas of the drill rod 23. On the female end of the drill rod 23, the termination point 403 will be positioned to correspond with the annular ring 401 of the spindle 39. When a lubricant, such as grease, is pumped through the spindle passageway 322, it will exit the termination point (aperture 405) into the annular ring 401, and then enter the rod passageway entry point 403. The lubricant is then directed through the axially extending drill rod passageway 402. This passageway may be either a void 404 in the drill rod 23 (e.g., an axially extending bore through a wall of the drill rod) an internal tube 405, or an external tube 406.

When implemented for use on an HDD machine, it is preferred that either one of the passageway configurations shown as passageways 404 or 405 be employed. Once the lubricant enters the rod passageway, such as passageway 404 for example, the lubricant can be transferred to the opposite end of the drill rod 23 to the exit point 407.

In operation, when removing rods 23 from a drill string, the joint between the drill string and the drill rod 23 will be broken. As that joint is unthreaded, lubricant will be pumped out of the exit point 407 at the distal end of the rod relative to the end proximate the spindle, which effectively lubricates the female end of the associated drill string (not shown) coupled to the distal end of rod 23. After this joint is separated, the rod 23 is pulled back slightly, and held rotationally. The spindle 39 is then rotated to break the upper joint, between the drill rod 23 and the drill spindle 39. Once the joint is broken, lubricant will begin being pumped out of the exit point 401, which will be rotating relative to the drill rod 23. In this manner, the drill rod will be automatically and thoroughly lubricated.

Figure 11:
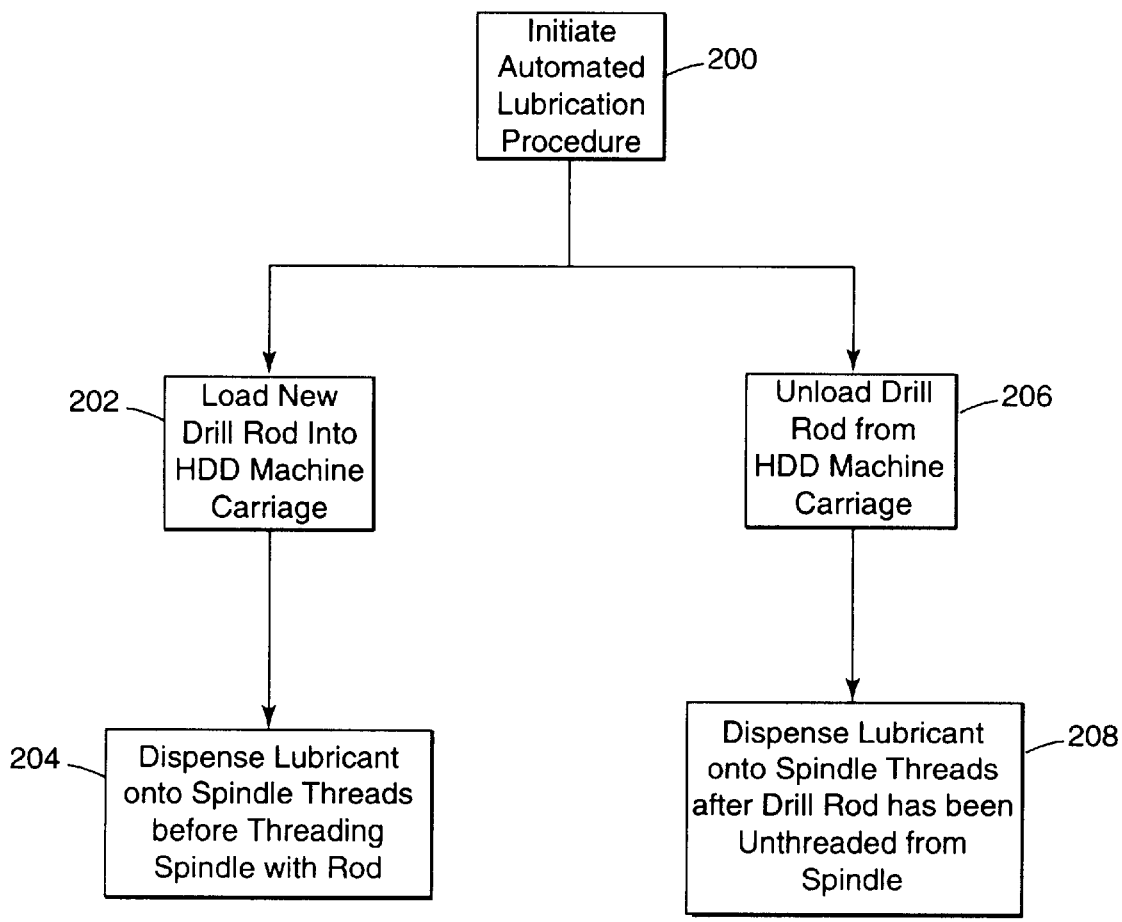
FIG. 11 is a flow diagram illustrating various generalized steps associated with an automated lubricant dispensing methodology of the present invention.

Turning now to FIG. 11, there is described in flow diagram form various steps associated with a generalized approach to automatically dispensing a lubricant to threads of a spindle 39 and/or drill rod 23 in accordance with the present invention. Dispensing of the lubricant to the threaded region of interest may be accomplished using a spray technique, an internal application technique or other direct contact technique, such as by use of the various application techniques previously described.

An automated lubricant dispensing sequence may be initiated 200 when loading 202 a new drill rod into the carriage of the HDD machine 20 as part of an automated rod loading operation. In general, a lubricant is dispensed 204 to the threads on the spindle before the spindle is threaded with the rod. An automated lubricant dispensing sequence may also be initiated 200 when unloading 206 a drill rod from the carriage of the HDD machine 20 as part of an automated rod unloading operation. In general, a lubricant is dispensed 208 to the threads on the spindle after a drill rod has been unthreaded from the spindle for transfer back into the rod magazine.

Figure 12:
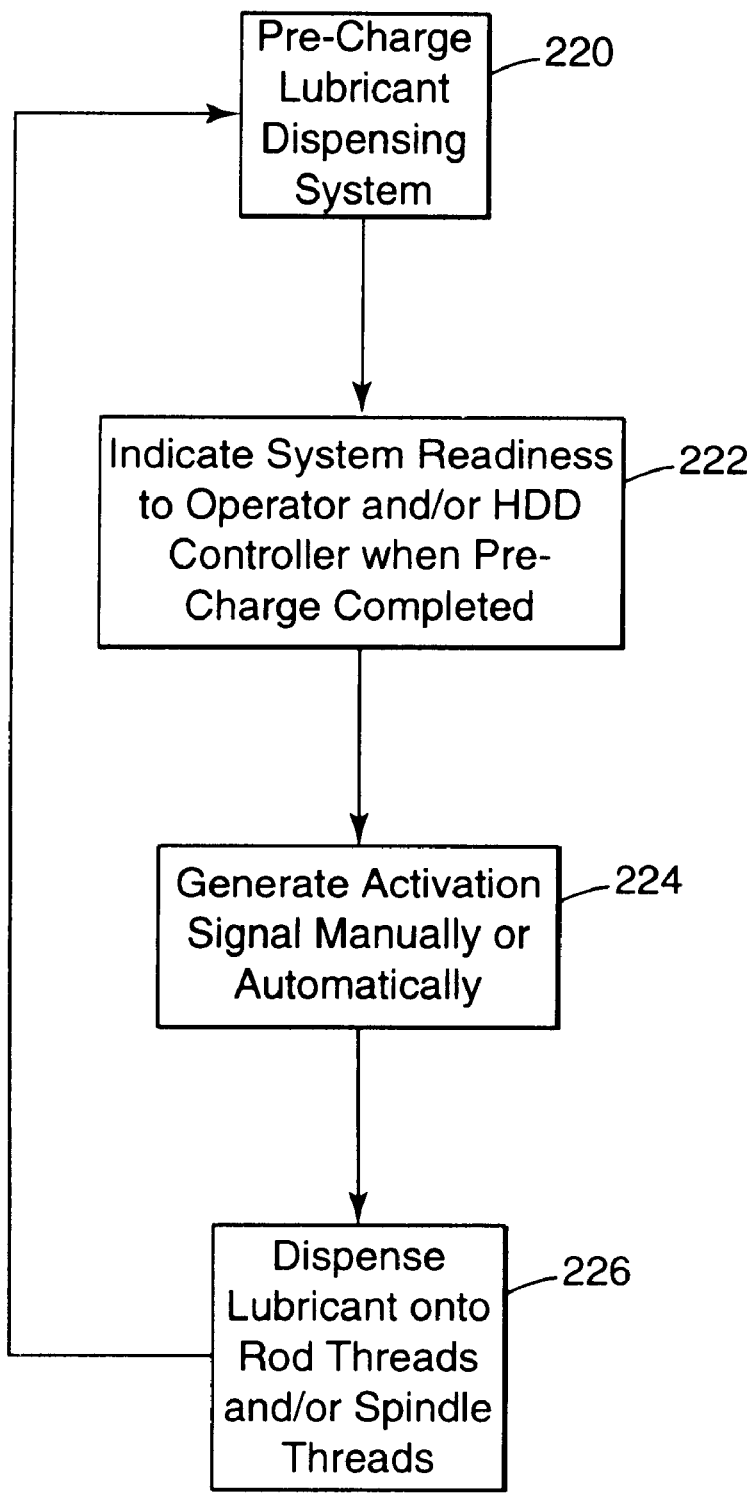
FIG. 12 is a flow diagram illustrating various steps associated with an automated lubricant dispensing methodology in accordance with one embodiment of the present invention.

FIG. 12 depicts various steps associated with an automated lubricant dispensing methodology in accordance with another embodiment of the present invention. The grease dispensing system is pre-charged 220 prior to activation. Upon reaching a pre-charged state, an indicator (e.g., visual, auditory, or tactile) is activated 222 to indicate to an operator that the lubricant dispensing system is ready for activation. The indicator may constitute a signal which is communicated to the HDD machine controller indicating the current state of readiness of the lubricant dispensing system.

An activation signal may then be generated 224 by the operator or HDD machine controller to initiate the lubrication process. A lubricant is dispensed 226 onto the spindle and/or rod threads in response to the activation signal. The above-described process may be repeated during HDD machine operation.

Figure 13:
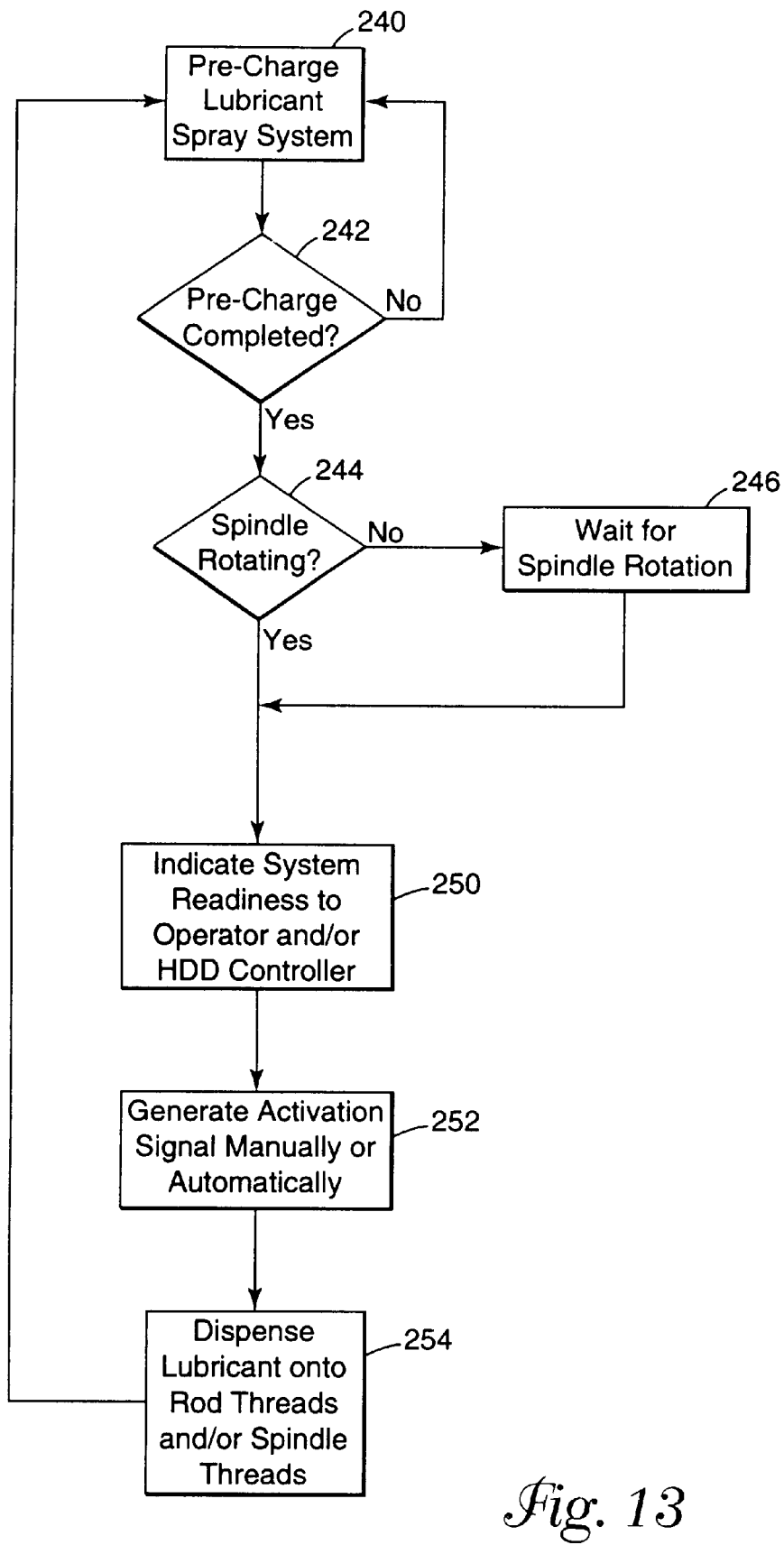
FIG. 13 is a flow diagram illustrating various steps associated with an automated lubricant dispensing methodology in accordance with another embodiment of the present invention.

FIG. 13 depicts various steps associated with an automated lubricant dispensing methodology in accordance with a further embodiment of the present invention. The grease dispensing system is pre-charged 240, 242 prior to activation. The state of spindle rotation is determined, typically by use of a rotation sensor. If 244 the spindle is not rotating, the lubricant dispensing system is not enabled 246 for activation. When the spindle is rotating, the lubricant dispensing system is enabled for activation.

Upon reaching a pre-charged state and detecting spindle rotation, an indicator is activated 250 to indicate to an operator that the lubricant dispensing system is ready for activation. The indicator may also constitute a signal which is communicated to the HDD machine controller indicating the current state of readiness of the lubricant dispensing system. An activation signal is then generated 252 by the operator or HDD machine controller to initiate the lubrication process. A lubricant is dispensed 254 onto the spindle and/or rod threads in response to the activation signal. The above-described process may be repeated during HDD machine operation.

Figure 14:
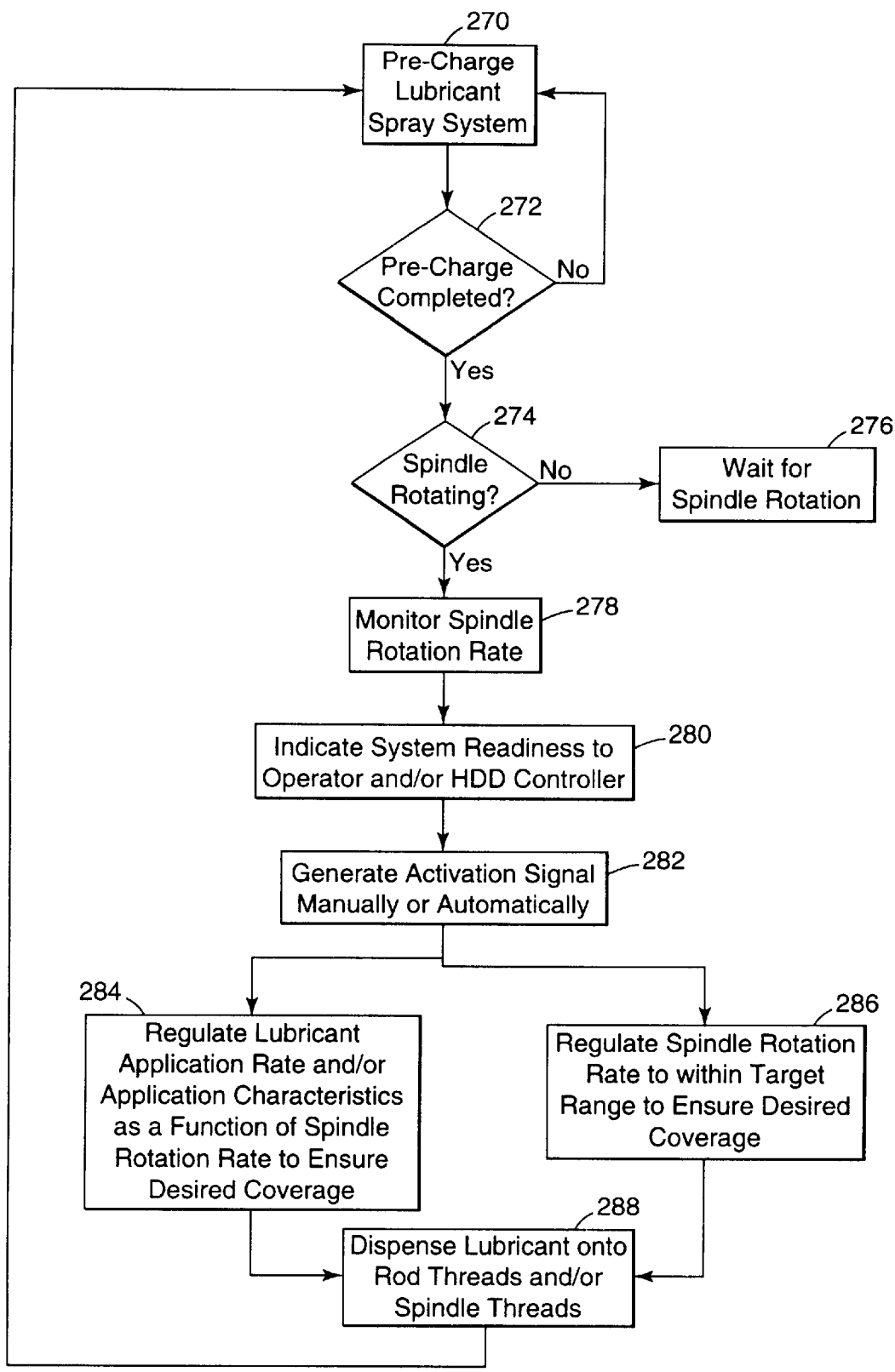
FIG. 14 is a flow diagram illustrating various steps associated with an automated lubricant dispensing methodology in accordance with a further embodiment of the present invention.

FIG. 14 depicts various steps associated with an automated lubricant dispensing methodology in accordance with a yet another embodiment of the present invention. The grease dispensing system is pre-charged 270, 272 prior to activation. The state of spindle rotation is determined. If 274 the spindle is not rotating, the lubricant dispensing system is not enabled 276 for activation. The rate of spindle rotation is monitored 278. When the spindle is rotating at a preestablished rate or within a range of rotation rates, the lubricant dispensing system is enabled for activation.

Upon reaching a pre-charged state and determining that the rate of spindle rotation reaches the preestablished acceptable rate, an indicator is activated 280 to indicate to an operator that the lubricant dispensing system is ready for activation. The indicator may also constitute a signal which is communicated to the HDD machine controller indicating the current state of readiness of the lubricant dispensing system. An activation signal is then generated 282 by the operator or HDD machine controller to initiate the lubrication process.

The rate of lubricant application and/or the characteristics of lubricant application (e.g., spray pattern cross-section and/or length) may be regulated 284 as a function of spindle rotation rate in order to ensure a desired coverage of lubricant on the threaded region of interest. The rate of spindle rotation may also be regulated 286 to within a preestablished target range to ensure proper coverage.

As was previously discussed, the application of the lubricant to a threaded region may be regulated in terms of various parameters, including duration of application, rate of application, and volume of application. For example, a fixed volume of lubricant may be dispensed independent of duration of application. By way of further example, a fixed volume of lubricant may be dispensed over a fixed duration of application time, such as a duration of time sufficient to coat threads of a given dimension during one complete revolution of the spindle at a minimum preestablished spindle speed.

A fixed volume of lubricant may also be dispensed by varying the application rate as a function of varying spindle speed. For example, the application rate may be increased as a function of increasing spindle speed and decreased as a function of decreasing spindle speed. The total volume of lubricant may be selected based on the volume of lubricant required to coat a threaded region during one complete spindle revolution at maximum preestablished spindle speed. The application rate may be adjusted as a function of decreasing spindle speed relative to the maximum preestablished spindle speed.

A lubricant is dispensed 288 onto the spindle and/or rod threads in response to the activation signal. The above-described process may be repeated during HDD machine operation.

It will, of course, be understood that various modifications and additions can be made to the preferred embodiments discussed hereinabove without departing from the scope of the present invention. For example, it will be appreciated that a lubricant supply system may have more than one applicator for supplying a lubricant to spindle-to-rod joints (e.g., gearbox at an upper position of the carriage) and to rod-to-rod threaded joints (e.g., gearbox at a lower position of the carriage). Also, a wide variety of lubricants may be used, including various types of grease and oils. Accordingly, the scope of the present invention should not be limited by the particular embodiments described above, but should be defined only by the claims set forth below and equivalents thereof.

What is claimed is:

1. A lubrication system for dispensing a lubricant to threads of a drill rod and/or a spindle of a horizontal directional drilling (HDD) machine during a rod loading or unloading operation, the lubrication system comprising:
   a pumping system comprising a lubricant reservoir, a pump, an applicator, and a lubricant supply conduit coupled between the pump and applicator;
   a heating unit coupled to the pumping station, the heating unit heating lubricant within the pumping system; and
   a control unit coupled to the pumping system, the control unit, in response to an operator signal or an HDD machine control signal, activating the pumping system to dispense a volume of lubricant from the applicator to the threads of the drill rod and/or spindle.

2. The system of claim 1, wherein the heating unit comprises an inlet port and an outlet port, the heating unit receiving a thermal transfer fluid from the HDD machine via the inlet port and returning the thermal transfer fluid to the HDD machine via the outlet port.

3. The system of claim 1, wherein the heating unit is coupled to a gearbox of the HDD machine and comprises an inlet port and an outlet port, the heating unit receiving a thermal transfer fluid from the gearbox via the inlet port and returning the thermal transfer fluid to the gearbox via the outlet port.

4. The system of claim 1, wherein the heating unit is coupled to an engine coolant system of the HDD machine and comprises an inlet port and an outlet port, the heating unit receiving a thermal transfer fluid from the engine coolant system via the inlet port and returning the thermal transfer fluid to the engine coolant system via the outlet port.

5. The system of claim 1, wherein the heating unit is coupled to a source of electrical power provided on or external to the HDD machine, the heating unit generating heat to heat lubricant within the pumping system in response to a current received from the electrical power source.

6. The system of claim 1, wherein the heating unit is controlled by the control unit to vary a viscosity of the lubricant.

7. The system of claim 1, wherein the heating unit comprises a first heat transfer unit coupled to the pumping system to heat lubricant within the pumping system and a second heat transfer unit coupled to the applicator to heat lubricant at the applicator.

8. The system of claim 1, wherein the heating unit comprises a first heat transfer unit coupled to the pumping system to heat lubricant within the pumping system and a third heat transfer unit coupled to the lubricant supply line to heat lubricant within the lubricant supply line.

9. The system of claim 1, wherein the pumping system is provided with hydraulic or pneumatic power supplied by the HDD machine.

10. The system of claim 1, wherein the pumping system is provided with electric or mechanical power from the HDD machine.

11. The system of claim 1, wherein the pumping system is provided with hydraulic power supplied by one or both of a rotation pump or a displacement pump of the HDD machine.

12. The system of claim 1, wherein the pumping system dispenses a fixed volume of lubricant through the applicator.

13. The system of claim 1, wherein the control unit produces a control signal to vary a rotation rate of the rod and/or spindle, and the pumping system dispenses a fixed volume of lubricant through the applicator at a variable dispensing rate during a time in which the rotation rate of the rod and/or spindle is varied.

14. The system of claim 1, wherein the applicator comprises a nozzle having an associated adjustable spray pattern, and the control unit adjusts one or both of a cross-sectional width of the spray pattern or a length of the spray pattern.

15. The system of claim 1, wherein the control unit, in response to a rotation rate of the rod and/or spindle, adjusts one or more characteristics of the pumping system to dispense a desired volume of lubricant to all or selected portions of a thread of the rod and/or spindle.

16. The system of claim 1, wherein the control unit controls a duration of dispensing produced by the pumping system during a time in which the spindle and rod are threaded together, the dispensing time being proportional to a rotation rate of the spindle and/or rod.

17. The system of claim 1, wherein the applicator comprises a nozzle, the nozzle comprising an orifice that varies in one or both of size or shape.

18. The system of claim 1, further comprising an indicator, the control unit activating the indicator to indicate readiness of the lubrication system.

19. The system of claim 1, wherein the activator comprises a nozzle and the pumping system is an airless pumping system.

20. The system of claim 1, further comprising a cleaning apparatus that cleans the threads of the spindle and/or rod.

21. The system of claim 20, wherein the control unit disables the pumping system from dispensing lubricant until the cleaning apparatus completes cleaning of the threads of the spindle and/or rod.

22. The system of claim 1, wherein the lubricant supply conduit comprises a passageway defined within a portion of the spindle, and the applicator comprises an aperture defined on a threaded surface of the spindle.

23. The system of claim 22, wherein the pump comprises a mechanical pump.

24. The system of claim 1, wherein the pumping system is provided with power supplied by the HDD machine or power source external to the HDD machine.

25. A lubrication system for dispensing a lubricant to threads of a drill rod and/or a spindle of a horizontal directional drilling (HDD) machine during a rod loading or unloading operation, the lubrication system comprising:
 a pumping system comprising a lubricant reservoir, a pump, an aperture defined on a threaded surface of the spindle, and a lubricant supply conduit coupled between the pump and aperture, the lubricant supply conduit defined within a portion of the spindle and having an inlet port defined on a surface of the spindle; and
 a control unit coupled to the pumping system, the control unit, in response to an operator signal or an HDD machine control signal, activating the pumping system to dispense a volume of lubricant from the aperture to the threads of the spindle and/or drill rod.

26. The system of claim 25, wherein the inlet port of the lubricant supply conduit is defined on a surface of the spindle free of threads.

27. The system of claim 25, wherein the lubricant reservoir and pump are supported on the HDD machine proximate the spindle, and the pump comprises an outlet that engages the inlet port of the lubricant supply conduit.

28. The system of claim 25, wherein the pumping system further comprises a pump collar comprising an annular sealed channel that encompasses the inlet port of the lubricant supply conduit, and the pump comprises an outlet that engages the pump collar.

29. The system of claim 25, wherein the pump constitutes a mechanical pump.

30. The system of claim 25, wherein the pump comprises a gearbox that engages the spindle.

31. The system of claim 30, wherein the pump dispenses lubricant at a rate proportional to a rate of rotation of the spindle.

32. The system of claim 25, wherein the pumping system dispenses a fixed volume of lubricant through the aperture.

33. The system of claim 25, wherein the control unit produces a control signal to vary a rotation rate of the rod and/or spindle, and the pumping system dispenses a fixed volume of lubricant through the aperture at a variable dispensing rate during a time in which the rotation rate of the rod and/or spindle is varied.

34. The system of claim 25, wherein the control unit controls a duration of lubricant dispensing by the pumping system during a dispensing time in which the spindle and rod are threaded together, the dispensing time being proportional to a rotation rate of the spindle and/or rod.

35. The system of claim 25, further comprising an indicator, the control unit activating the indicator to indicate readiness of the lubrication system.

36. The system of claim 25, further comprising a heating unit coupled to the pumping system.

37. The system of claim 25, wherein the drill rod comprises a conduit extending axially along a length of the drill rod and terminating at threaded proximate and distal ends of the drill rod, the pumping system dispensing lubricant through the spindle aperture and through the drill rod conduit to the threaded distal end of the drill rod.

38. The system of claim 25, wherein the pump produces a force on the lubricant sufficient to dispense the lubricant from the aperture to untightened spindle/drill rod threads, and further wherein the pump produces a force on the lubricant insufficient to dispense lubricant from the aperture to tightened spindle/drill rod threads.

39. A method of dispensing a lubricant to threads of a drill rod and/or a spindle of a horizontal directional drilling (HDD) machine during a rod loading or unloading operation, the method comprising:
 rotating the spindle and/or drill rod;
 dispensing the lubricant to the threads of the spindle and/or drill rod; and
 controlling one of a lubricant dispensing rate or a spindle rotation rate to dispense the lubricant substantially over a circumferential surface of the threads of the spindle and/or drill rod.

40. The method of claim 39, wherein dispensing the lubricant comprises dispensing a fixed volume of the lubricant.

41. The method of claim 39, wherein dispensing the lubricant comprises dispensing a variable volume of the lubricant.

42. The method of claim 39, wherein controlling the lubricant dispensing rate comprises controlling the lubricant dispensing rate as a function of spindle rotation rate.

43. The method of claim 39, wherein controlling the lubricant dispensing rate comprises controlling the lubricant dispensing rate of a fixed volume of the lubricant as a function of spindle rotation rate.

44. The method of claim 39, wherein controlling the spindle rotation rate comprises varying the spindle rotation rate to dispense a fixed volume of the lubricant substantially over the circumferential surface of the threads of the spindle and/or drill rod.

45. The method of claim 39, wherein controlling the lubricant dispensing rate comprises controlling the lubricant dispensing rate as a function of spindle diameter and a preestablished spindle rotation rate.

46. The method of claim 39, wherein dispensing the lubricant comprises spraying the lubricant onto the threads of the spindle and/or the drill rod.

47. The method of claim 39, wherein dispensing the lubricant comprises communicating the lubricant through a passageway defined within the spindle to one or more apertures defined within the threads of the spindle and/or the drill rod.

48. The method of claim 39, further comprising heating the lubricant.

49. A lubrication system for dispensing a lubricant to threads of a drill rod and/or a spindle of a horizontal directional drilling (HDD) machine during a rod loading or unloading operation, the lubrication system comprising:
 a pumping system comprising a lubricant reservoir, a pump, an applicator, and a lubricant supply conduit coupled between the pump and applicator; and
 a control unit coupled to the pumping system, the control unit, in response to an operator signal or an HDD machine control signal, activating the pumping system to dispense the lubricant substantially over a circumferential surface of the threads of the spindle and/or drill rod.

50. The system of claim 49, further comprising a heating unit coupled to the pumping station, the heating unit heating lubricant within the pumping system.

51. The system of claim 49, further comprising a heating unit coupled to the applicator, the heating unit heating lubricant within the applicator.

52. The system of claim 49, wherein the applicator comprises one of a spray applicator, an applicator that contacts the threads, or an aperture defined within a region of the threads which communicates the lubricant to the threads received from a passageway defined within the spindle.

53. A lubrication system for dispensing a lubricant to threads of a drill rod and/or a spindle of a horizontal directional drilling (HDD) machine during a rod loading or unloading operation, the lubrication system comprising:
 a pump;
 a lubricant reservoir;
 an aperture defined on a threaded surface of the spindle; and
 a lubricant supply conduit coupled between the pump and aperture, the lubricant supply conduit defined within a portion of the spindle and having an inlet port defined on a surface of the spindle.

54. The system of claim 53, wherein the pump dispenses lubricant at a rate proportional to a rate of rotation of the spindle or until a set maximum pressure is achieved.

55. The system of claim 53, wherein the drill rod comprises a conduit extending axially along a length of the drill rod and terminating at threaded proximate and distal ends of the drill rod, the pumping system dispensing lubricant through the spindle aperture and through the drill rod conduit to the threaded distal end of the drill rod.

56. A method of dispensing a lubricant to threads of a drill rod and/or a spindle of a horizontal directional drilling (HDD) machine during a rod loading or unloading operation, the method comprising:
 pumping lubricant to the threads at a maximum pressure such that no substantial flow of lubricant occurs when the threads are forcibly engaged; and
 pumping the lubricant to the threads of the spindle and/or drill rod such that when the threads are not forcibly engaged, a lubricant flow rate sufficient to properly lubricate the threads is achieved.

57. The method of claim 56 wherein the lubricant flow rate is proportional to the rotational speed of the spindle.

* * * * *